US012659573B2

(12) United States Patent　　　(10) Patent No.:　US 12,659,573 B2
Hara et al.　　　　　　　　　　　　(45) Date of Patent:　　Jun. 16, 2026

(54) EXTERNAL DISPLAY DEVICE, INFORMATION PROCESSING DEVICE, AND EXTERNAL DISPLAY METHOD

(71) Applicant: SONY GROUP CORPORATION, Tokyo (JP)

(72) Inventors: Mizuho Hara, Tokyo (JP); Masaaki Hasegawa, Tokyo (JP); Takafumi Yagi, Tokyo (JP); Jiro Kawano, Tokyo (JP); Ryosuke Takeuchi, Tokyo (JP); Masaki Seya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 89 days.

(21) Appl. No.: 18/701,262

(22) PCT Filed: Sep. 21, 2022

(86) PCT No.: PCT/JP2022/035049
　§ 371 (c)(1),
　(2) Date: Apr. 15, 2024

(87) PCT Pub. No.: WO2023/074195
　PCT Pub. Date: May 4, 2023

(65) Prior Publication Data
　US 2025/0267357 A1　　Aug. 21, 2025

(30) Foreign Application Priority Data

Oct. 25, 2021　(JP) ................................. 2021-173686

(51) Int. Cl.
　*H04N 23/63*　　　(2023.01)
　*H04N 23/53*　　　(2023.01)

(52) U.S. Cl.
　CPC ......... *H04N 23/633* (2023.01); *H04N 23/531* (2023.01); *H04N 23/632* (2023.01)

(58) Field of Classification Search
　None
　See application file for complete search history.

(56) References Cited

U.S. PATENT DOCUMENTS

2013/0076963 A1 *　3/2013　Sirpal ................... G06F 1/1643
　　　　　　　　　　　　　　　　　　　　348/333.01
2018/0213175 A1 *　7/2018　Hlavac ............... H04N 1/00095

FOREIGN PATENT DOCUMENTS

CN　　　206650708 U　* 11/2017　............. H04M 1/04
CN　　　207471091 U　　6/2018
　　　　　　　　　(Continued)

OTHER PUBLICATIONS

Zhu Lei; CN-206650708-U; An Intelligent Self Heterodyne Rod; Nov. 17, 2017; English Translation; pp. 1-5 (Year: 2017).*

(Continued)

*Primary Examiner* — Cynthia Calderon
(74) *Attorney, Agent, or Firm* — CHIP LAW GROUP

(57) ABSTRACT

There is provided a sub display which is an example of an external display device and which includes a display unit that is detachably provided together with a smartphone which is an example of an information processing device including a camera, with respect to a holding portion provided so as to be grippable by a user, a communication control unit that controls communication with a camera application using the camera operating on the smartphone, and a display control unit that causes the display unit to display a sub screen which is an example of an external display screen generated by the camera application and received via the communication control unit.

9 Claims, 23 Drawing Sheets

(56)            References Cited

FOREIGN PATENT DOCUMENTS

| | | | |
|---|---|---|---|
| JP | 2004-088396 A | 3/2004 | |
| JP | 2015-133681 A | 7/2015 | |
| JP | 2020-027178 A | 2/2020 | |
| JP | 2021018268 A * | 2/2021 | .............. G10H 1/32 |

OTHER PUBLICATIONS

Nomura Keiko; JP-2021018268-A; Electronic Apparatus; Feb. 15, 2021; English Translation; pp. 1-7 (Year: 2021).*
International Search Report and Written Opinion of PCT Application No. PCT/JP2022/035049, issued on Nov. 29, 2022, 08 pages of ISRWO.

* cited by examiner

| DISPLAY CONTENT |
|---|
| CAMERA-THROUGH IMAGE |
| FOCUS FRAME |
| Rec STATUS |
| Audio LEVEL |
| REMAINING AMOUNT OF BATTERY OF SMARTPHONE |
| HIGH TEMPERATURE DETECTION MARK |
| SELF TIMER |
| THUMBNAIL |
| NUMBER OF CONTINUOUS SHOT SHEETS |
| ⋮ |

FIG.13

| No. | PROCESSING SEQUENCE | EXPLANA-TORY DIAGRAM |
|---|---|---|
| 1 | CAMERA APPLICATION START →SUB DISPLAY CONNECTION | FIG. 14 |
| 2 | SUB DISPLAY CONNECTION →CAMERA APPLICATION START | FIG. 16 |
| 3 | CONNECTED→CAMERA APPLICATION END | FIG. 17 |
| 4 | CONNECTED→SUB DISPLAY DISCONNECTION | FIG. 18 |
| 5 | CONNECTED→SUB DISPLAY OFF/ON | FIG. 19 |
| 6 | CONNECTED →Pause/Resume OF SMARTPHONE | FIG. 20 |
| 7 | CONNECTED →EXTERNAL POWER DISCONNECTION | FIG. 21 |
| 8 | CONNECTED→BATTERY SHORTAGE | FIG. 22 |
| 9 | CONNECTED →FORCED END OF CAMERA APPLICATION | FIG. 24 |

FIG.16

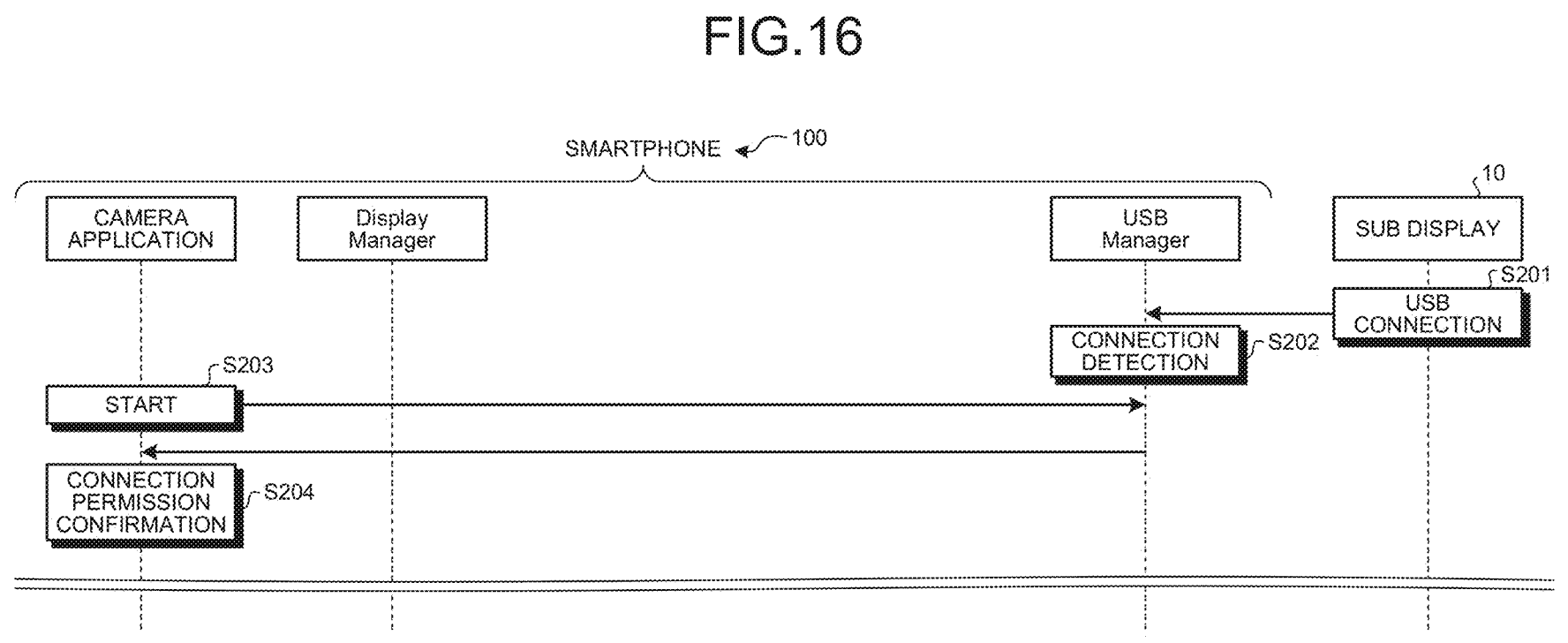

SMARTPHONE 100

CAMERA APPLICATION

Display Manager

USB Manager

SUB DISPLAY 10

S201
USB CONNECTION

S202
CONNECTION DETECTION

S203
START

S204
CONNECTION PERMISSION CONFIRMATION

REC ▭▭▭ 100%

DEFAULT DISPLAY

L
R

EXTERNAL DISPLAY DEVICE, INFORMATION PROCESSING DEVICE, AND EXTERNAL DISPLAY METHOD

CROSS REFERENCE TO RELATED APPLICATIONS

This application is a U.S. National Phase of International Patent Application No. PCT/JP2022/035049 filed on Sep. 21, 2022, which claims priority benefit of Japanese Patent Application No. JP 2021-173686 filed in the Japan Patent Office on Oct. 25, 2021. Each of the above-referenced applications is hereby incorporated herein by reference in its entirety.

FIELD

The present disclosure relates to an external display device, an information processing device, and an external display method.

BACKGROUND

In recent years, the spread of portable information processing devices such as smartphones and tablet terminals is remarkable. In addition, performance of these portable information processing devices has also been rapidly improved, and for example, models including a high-performance out-camera and a high-performance in-camera have become mainstream.

In such an information processing device, various services such as a social networking service (SNS) become widespread, and application software (hereinafter, referred to as a "camera application") using a camera is often used in order for a user to edit an image shoot by himself or herself or upload the image to various services.

By the way, when using the camera application, the user can perform shooting using an out-camera, a self-portrait photograph using an in-camera, and the like while viewing a camera-through image of a camera viewpoint displayed on a display device such as a liquid crystal display (LCD) mounted on a main body of the information processing device.

However, such a display device has a limited display area, and there is a problem that display of various types of information other than a camera-through image, such as operation components and shooting information required at the time of using a camera application, is limited.

In response to such a problem, a technology has been proposed in which two displays are connected to one camera body, a camera-through image is displayed on one display, and various types of information related to shooting other than the camera-through image are displayed on the other display (See, for example, Patent Literature 1).

CITATION LIST

Patent Literature

Patent Literature 1: JP 2015-133681 A

SUMMARY

Technical Problem

However, the above-described technology in the related art has room for further improvement in improving convenience at the time of using the camera application.

For example, the camera application is usually used in a state where the user directly holds the information processing device. However, in such a state, there are problems that the position and the angle of the camera with respect to the subject are limited, it is difficult to hold the position of the camera, and it is difficult to see a camera-through image displayed on the display device.

Therefore, the present disclosure proposes an external display device, an information processing device, and an external display method capable of improving convenience at the time of using a camera application.

Solution to Problem

In order to solve the above problems, one aspect of an external display device according to the present disclosure includes: a display unit that is detachably provided together with an information processing device including a camera, with respect to a holding portion provided so as to be grippable by a user; a communication control unit that controls communication with a camera application using the camera operating in the information processing device; and a display control unit that causes the display unit to display an external display screen generated by the camera application and received via the communication control unit.

BRIEF DESCRIPTION OF DRAWINGS

FIG. 13 is an explanatory diagram of the contents of each processing sequence.

FIG. 16 is a processing sequence in a case where the camera application is started after the sub display is connected.

DESCRIPTION OF EMBODIMENTS

Figure 1:
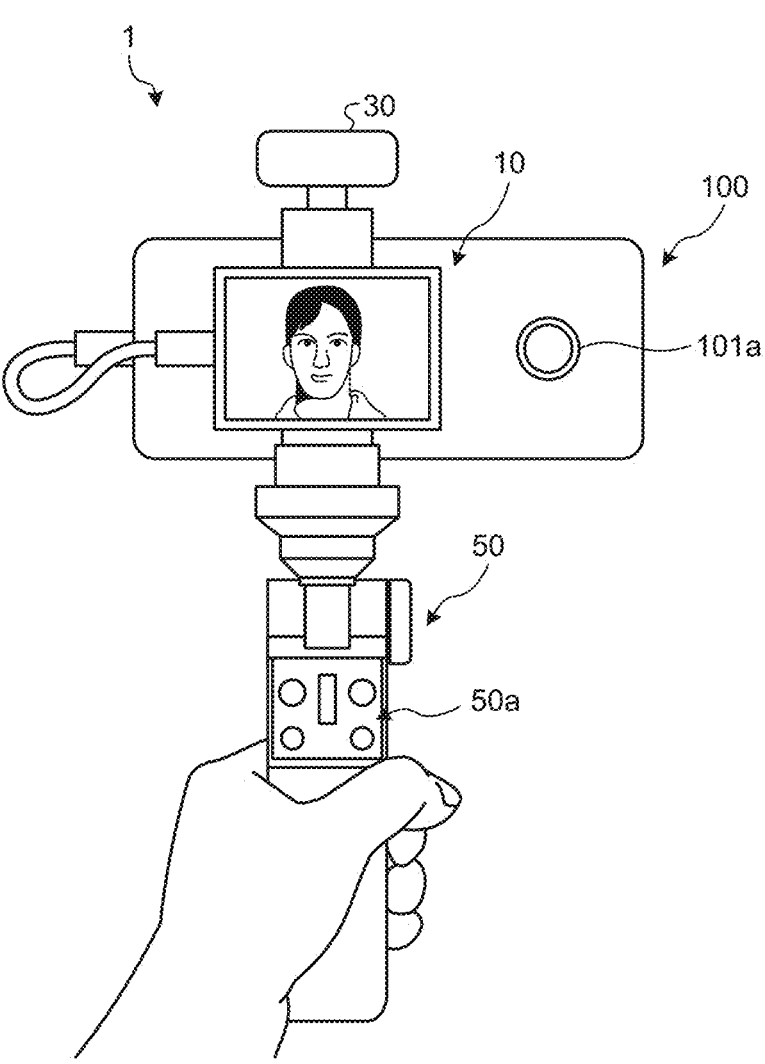
FIG. 1 is a diagram illustrating a configuration example of an external display system according to an embodiment of the present disclosure.

Hereinafter, embodiments of the present disclosure are described in detail based on the accompanying drawings. Note that, in each of the following embodiments, the same portions are denoted by the same reference numerals, and redundant description is omitted.

Furthermore, in the following description, a case where a portable information processing device used by the user is a smartphone 100 is described as an example. Furthermore, in the following description, an external display device according to an embodiment of the present disclosure is a sub display 10, and the sub display 10 is an external display device connectable to the smartphone 100 as a peripheral device (hereinafter, referred to as an "accessory") of the smartphone 100.

In addition, the present disclosure is described according to the following item order.

1. Overview
2. Configuration of Sub Display
3. Configuration of Smartphone
4. Display Example
4-1. Display Example of Sub Screen
4-2. Display Example on Smartphone Side
4-3. Display Example of Sub Screen During Change of Aspect Ratio
4-4. Display Example of Sub Screen During Operation of Flip Key
5. Each Processing Sequence
5-1. Camera Application Start→Sub Display Connection
5-2. Sub Display Connection→Camera Application Start
5-3. Connected→Camera Application End
5-4. Connected→Sub Display Disconnection
5-5. Connected→Sub Display Off/On
5-6. Connected→Pause/Resume of Smartphone 5-7. Connected→External Power Supply Disconnection
5-8. Connected→Battery Shortage
5-9. Connected→Forced End of Camera Application
6. Modifications
6-1. First Modification
6-2. Second Modification
6-3. Third Modification
6-4. Other Modifications
7. Hardware Configuration
8. Conclusion

1. Overview

When a user uses a camera application by using the smartphone 100, the camera application is usually used in a state where the user directly holds the smartphone 100 in the hand. However, in such a state, there are problems that the position and the angle of the camera of the smartphone 100 with respect to a subject are limited, it is difficult to hold the position of the camera, and it is difficult to see a camera-through image displayed on a display device of the smartphone 100.

Therefore, in the embodiment of the present disclosure, the sub display 10 is provided as an accessory of the smartphone 100. FIG. 1 is a diagram illustrating a configuration example of an external display system 1 according to the embodiment of the present disclosure.

As illustrated in FIG. 1, the external display system 1 includes the sub display 10, a microphone 30, and a holding portion 50. The sub display 10, the microphone 30, and the holding portion 50 are configured as accessories of the smartphone 100.

The sub display 10 is a device that functions as a secondary display device of the smartphone 100. The microphone 30 is provided to collect external voice and input the collected sound to the sub display 10.

The holding portion 50 is configured as a holding component of the smartphone 100. The holding portion 50 is detachably provided with the smartphone 100. Also, the holding portion 50 is provided, for example, in a rod shape.

As illustrated in FIG. 1, in a state where the smartphone 100 is mounted, the holding portion 50 holds the smartphone 100 sideways in a state where the smartphone 100 is orthogonal to the longitudinal direction thereof on one end side of the holding portion 50. The user grips the other end side of the holding portion 50 holding the smartphone 100 with his/her own hand.

Furthermore, at this time, the holding portion 50 holds, for example, an out-camera 101*a* of the smartphone 100 so as to face the front side, that is, the user. That is, in such a case, the display device of the main body of the smartphone 100 faces the back side of the smartphone 100 as viewed from the user.

More specifically, the smartphone 100 has the display device and an in-camera on one main surface and has the out-camera 101*a* on the other main surface, which is the back surface, but has no display device. Compared with the performance of the out-camera 101*a* provided on the main surface having no display device, the in-camera provided on the same main surface as the display device has low performance or equivalent performance. Note that, since a self-portrait photograph is captured while viewing the display surface of the display device, it is common to use an in-camera provided on the same main surface as the display device. On the other hand, also at the time of capturing the self-portrait photograph, there may be a user who desires to use the high-performance out-camera 101*a*.

Note that, as illustrated in FIG. 1, the holding portion 50 can be integrally provided with, for example, a remote controller 50a, and the user can operate the smartphone 100 via the remote controller 50a. The remote controller 50a is connected to the smartphone 100, for example, by Bluetooth (registered trademark) or the like.

The sub display 10 and the microphone 30 are also detachably provided with respect to the holding portion 50. The sub display 10 is mounted on the front side of the smartphone 100 in a state where the user faces the display surface in a state where the smartphone 100 is held. Furthermore, the sub display 10 is connected to the smartphone 100, for example, by a universal serial bus (USB) or the like. The microphone 30 is mounted at a position near the smartphone 100.

In the external display system 1 configured in this manner, the sub display 10 functions as an external display device of the smartphone 100 at the time of using a camera application or the like. For example, in the arrangement state of each device illustrated in FIG. 1, the external display system 1 provides a self-portrait photograph function via a camera application, and the sub display 10 functions as a camera through monitor for such a self-portrait photograph function.

2. Configuration of Sub Display

Figure 2:
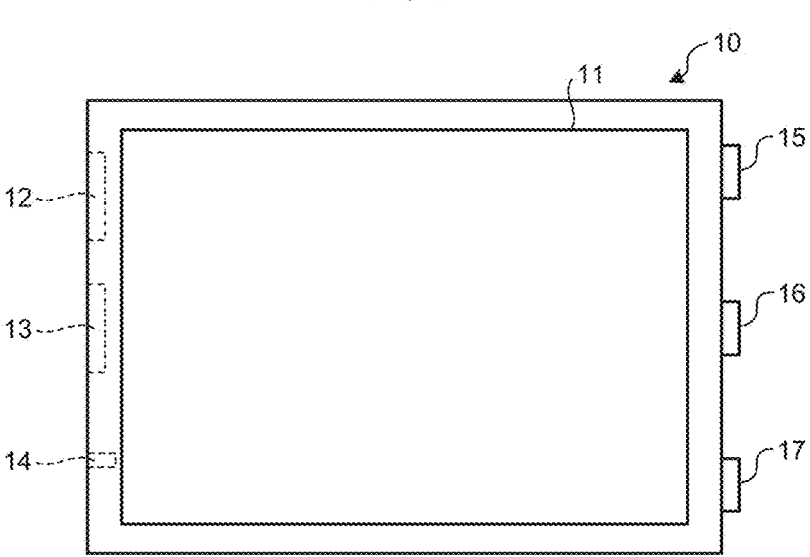
FIG. 2 is a diagram illustrating a configuration example of a sub display according to the embodiment of the present disclosure.

A configuration example of the sub display 10 is specifically described. FIG. 2 is a diagram illustrating the configuration example of the sub display 10 according to the embodiment of the present disclosure. As illustrated in FIG. 2, the sub display 10 includes a display unit 11, a first communication unit 12, a second communication unit 13, a voice input unit 14, an on/off switch 15, a flip key 16, and a luminance key 17.

The display unit 11 is a display device serving as an information display area of the sub display 10, and is implemented by, for example, the above-described LCD or an organic light emitting diode (OLED). The first communication unit 12 is a connection interface component with the smartphone 100. The second communication unit 13 is a connection interface component with an external power supply 70 described below.

In the embodiment of the present disclosure, the first communication unit 12 and the second communication unit 13 are USB Type-C connectors, and the standard is USB 3.0 or more, but the communication form with the smartphone 100 and the external power supply 70 is not limited.

The voice input unit 14 is a connection interface component with the microphone 30 and is, for example, a 3.5-mm stereo mini terminal. Note that the voice input via the voice input unit 14 can be output from a control unit 18 to the smartphone 100 as a USB audio via the first communication unit 12.

The on/off switch 15 is a switch that turns on or off the display unit 11. The flip key 16 is an operation component for reversing/rotating an image and repeats reversing/rotating an image displayed on the display unit 11 every time the flip key is pressed. A specific example of the movement is described below with reference to FIG. 12. The luminance key 17 is an operation component for luminance adjustment of the display unit 11.

Figure 3:
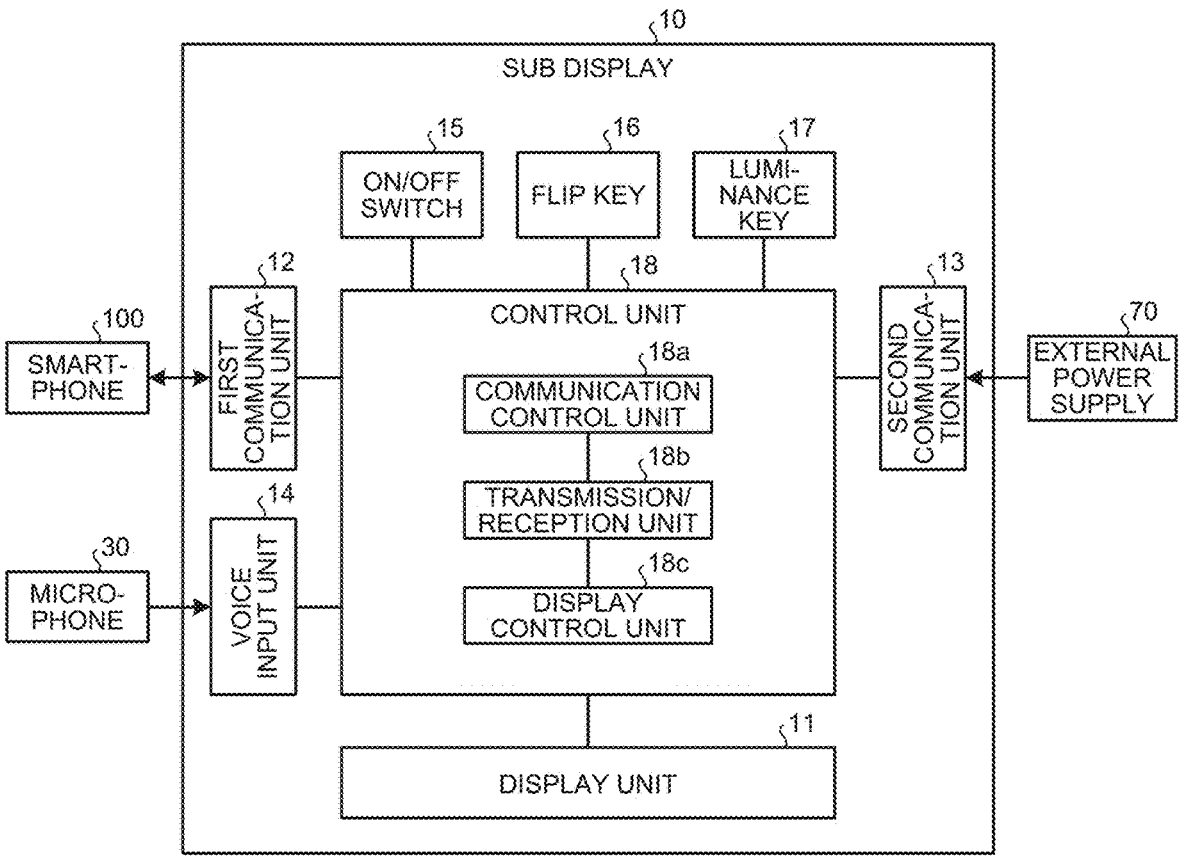
FIG. 3 is a block diagram illustrating a configuration example of the sub display according to the embodiment of the present disclosure.

Next, FIG. 3 is a block diagram illustrating the configuration example of the sub display 10 according to the embodiment of the present disclosure. Note that, in FIG. 3 and FIG. 4 illustrated below, only components required for describing features of the embodiment of the present disclosure are illustrated, and descriptions of general components are omitted.

Figure 4:
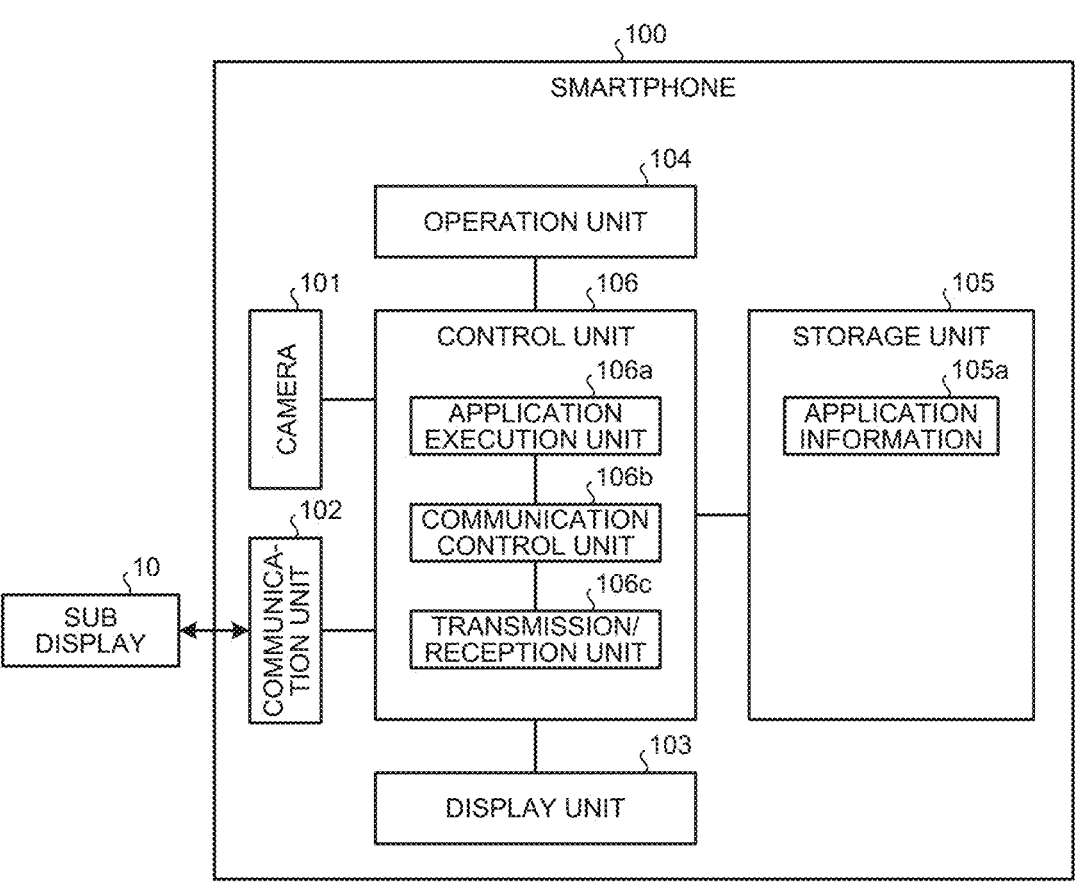
FIG. 4 is a block diagram illustrating a configuration example of a smartphone according to the embodiment of the present disclosure.

In other words, components illustrated in FIGS. 3 and 4 are functionally conceptual and are not necessarily physically configured as illustrated in the drawings. For example, a specific form of distribution and integration of each block is not limited to the illustrated form, and all or a part thereof can be configured to be functionally or physically distributed and integrated in an arbitrary unit according to various loads, usage statuses, and the like.

In the description using FIGS. 3 and 4, the description of the already described components may be simplified or omitted.

As illustrated in FIG. 3, the sub display 10 includes the display unit 11, the first communication unit 12, the second communication unit 13, the voice input unit 14, the on/off switch 15, the flip key 16, the luminance key 17, and the control unit 18.

Since the display unit 11, the first communication unit 12, the second communication unit 13, the voice input unit 14, the on/off switch 15, the flip key 16, and the luminance key 17 have already been described, the description thereof is omitted here.

Note that, in a state where the external power supply 70 such as a mobile battery is not connected, the sub display 10 operates by receiving power supply from the smartphone 100 via the first communication unit 12. Meanwhile, in a state where the external power supply 70 is connected, the sub display can operate by receiving power supply from the external power supply 70 via the second communication unit 13 and charge the smartphone 100 via the first communication unit 12 with the power of the external power supply 70.

The control unit 18 is a controller and is implemented by, for example, a central processing unit (CPU), a micro processing unit (MPU), or the like executing various programs stored in a storage unit (not illustrated) using a RAM as a work area. Also, the control unit 18 can be implemented by, for example, an integrated circuit such as an application specific integrated circuit (ASIC) or a field programmable gate array (FPGA).

In a case where the display unit 11 is implemented by, for example, an LCD, the control unit 18 configures a so-called LCD module integrally with the display unit 11. The control unit 18 includes a communication control unit 18a, a transmission/reception unit 18b, and a display control unit 18c and implements or executes a function and an action of information processing described below.

The communication control unit 18a controls communication with the smartphone 100 via the first communication unit 12. Furthermore, the communication control unit 18a controls communication with the external power supply 70 via the second communication unit 13.

The transmission/reception unit 18b transmits and receives various data to and from the smartphone 100 via the first communication unit 12 based on the control of the communication control unit 18a. Furthermore, the transmission/reception unit 18b transmits and receives various data to and from the external power supply 70 via the second communication unit 13 based on the control of the communication control unit 18a.

The display control unit 18c corresponds to a drive unit of the display unit 11 and causes the display unit 11 to display a screen for the sub display 10 transmitted from the smartphone 100. Hereinafter, the screen for the sub display 10 is appropriately referred to as a "sub screen".

3. Configuration of Smartphone

Next, a configuration example of the smartphone 100 is described. FIG. 4 is a block diagram illustrating a configuration example of the smartphone 100 according to the embodiment of the present disclosure.

As illustrated in FIG. 4, the smartphone 100 includes a camera 101, a communication unit 102, a display unit 103, an operation unit 104, a storage unit 105, and a control unit 106.

The camera 101 is a camera mounted on the main body of the smartphone 100 and includes the above-described out-camera 101*a*. The communication unit 102 is a connection interface component with the sub display 10 and performs USB connection with the sub display 10 in the embodiment of the present disclosure.

The display unit 103 is a display device that is mounted on the main body of the smartphone 100 and presents visual information, and presents visual information such as a moving image and text and visual information related to an application under the control of the control unit 106 described below. Examples of the display device include the LCD and the OLED described above. The operation unit 104 is an operation component mounted on the main body of the smartphone 100. Note that the operation unit 104 may be configured integrally with the display unit 103 by a touch panel. Therefore, the operation unit 104 may be a software component, and in the embodiment of the present disclosure, the operation unit 104 may be, for example, a graphical user interface (GUI) operably displayed on the display unit 103 by the camera application.

The storage unit 105 is implemented by, for example, a semiconductor memory element such as a random access memory (RAM), a read only memory (ROM), or a flash memory. In the example illustrated in FIG. 4, the storage unit 105 stores application information 105*a*.

The application information 105*a* is information including a program of the camera application, various parameters used during start of the camera application, and the like.

The control unit 106 is a controller and is implemented by, for example, a CPU, an MPU, or the like executing various programs stored in the storage unit 105 using the RAM as a work area. Furthermore, the control unit 106 can be implemented, for example, by an integrated circuit such as an ASIC or an FPGA.

The control unit 106 includes an application execution unit 106*a*, a communication control unit 106*b*, and a transmission/reception unit 106*c* and implements or executes a function and an action of information processing described below.

The application execution unit 106*a* reads the application information 105*a* stored in the storage unit 105 and executes the camera application. In a state where the sub display 10 is not connected, the application execution unit 106*a* performs display control, on the display unit 103 of the smartphone 100, of a screen related to the execution of the camera application.

In addition, in a state where the sub display 10 is connected and a communication connection with the sub display 10 is established, the application execution unit 106*a* performs display control of the sub screen on the sub display 10. For easy understanding of this point, a basic data flow between the smartphone 100 and the sub display 10 is described with reference to FIGS. 5 and 6.

Figure 5:
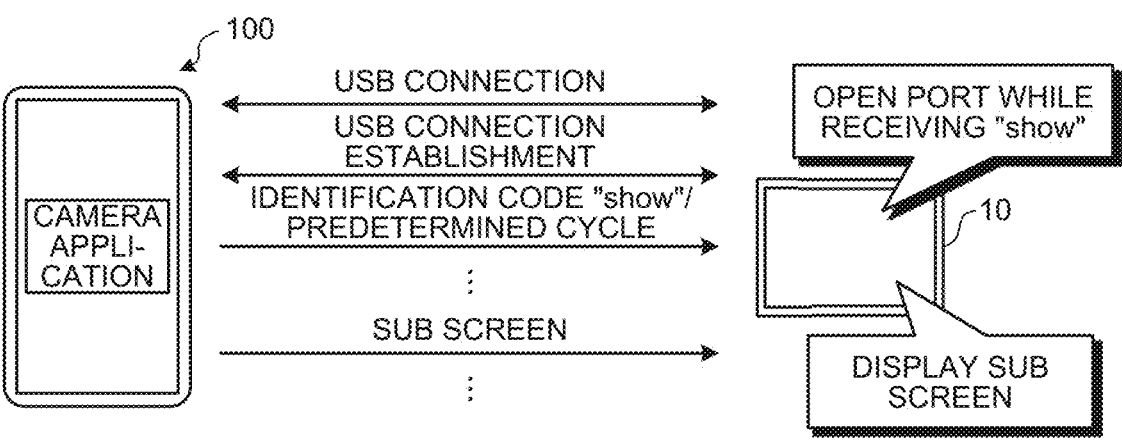
FIG. 5 is a basic data flow (part 1) between the smartphone and the sub display.
Figure 6:
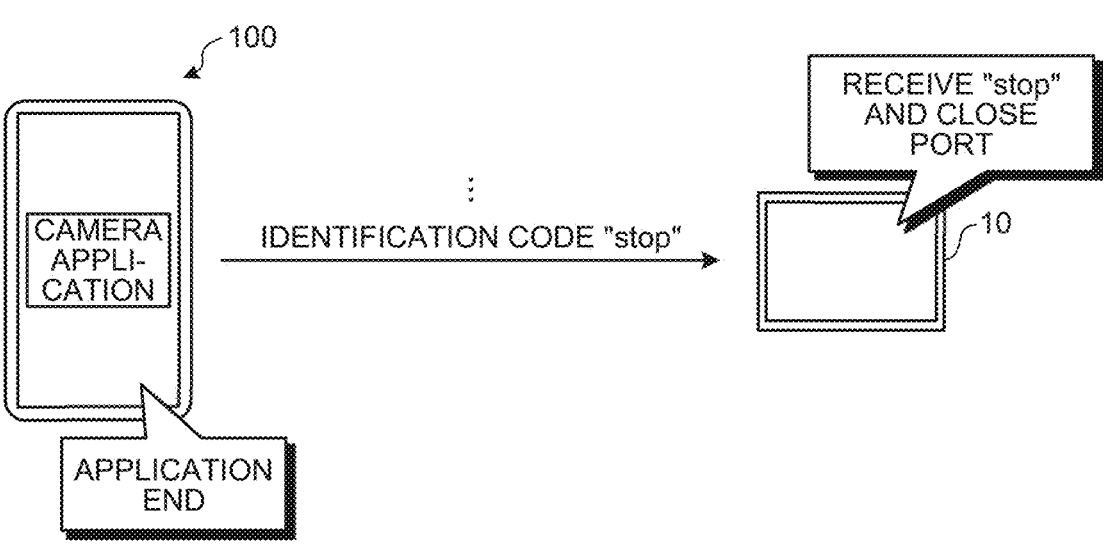
FIG. 6 is a basic data flow (part 2) between the smartphone and the sub display.

FIG. 5 is a basic data flow (part 1) between the smartphone 100 and the sub display 10. Also, FIG. 6 is a basic data flow (part 2) between the smartphone 100 and the sub display 10.

As shown in FIG. 5, in the embodiment of the present disclosure, when the smartphone 100 and the sub display 10 are connected by USB, and a communication connection, here, USB connection is established, the smartphone 100 transmits an identification code "show" to the sub display 10 via such a connection.

The identification code is code information for identifying a valid communication partner as viewed from the sub display 10 and "show" is also a command for displaying image information from the valid communication partner.

The sub display 10 opens the own display port when being confirmed that it is a valid communication partner by the identification code "show". Note that the smartphone 100 continues to send the identification code "show" at a predetermined cycle (for example, every 400 ms), and the sub display 10 opens the port while receiving the "show".

Meanwhile, as illustrated in FIG. 6, the smartphone 100 transmits an identification code "stop" to the sub display 10 when the application is ended. The sub display 10 receives the "stop" and closes the own display port.

Note that FIGS. 5 and 6 merely illustrate a basic data flow illustrating features of the embodiment of the present disclosure. Processing sequences of various situations are described below with reference to FIG. 13 and subsequent drawings.

The description returns to FIG. 4. The communication control unit 106*b* controls communication with the sub display 10 via the communication unit 102 according to the execution content of the camera application of the application execution unit 106*a*. The transmission/reception unit 106*c* transmits and receives various data to and from the sub display 10 via the communication unit 102 based on the control of the communication control unit 106*b*.

4. Display Example

<4-1. Display Example of Sub Screen>

Next, a display example of various types of information in the external display system 1 is described. First, display contents of the sub screen are described.

Figures 7, 8:
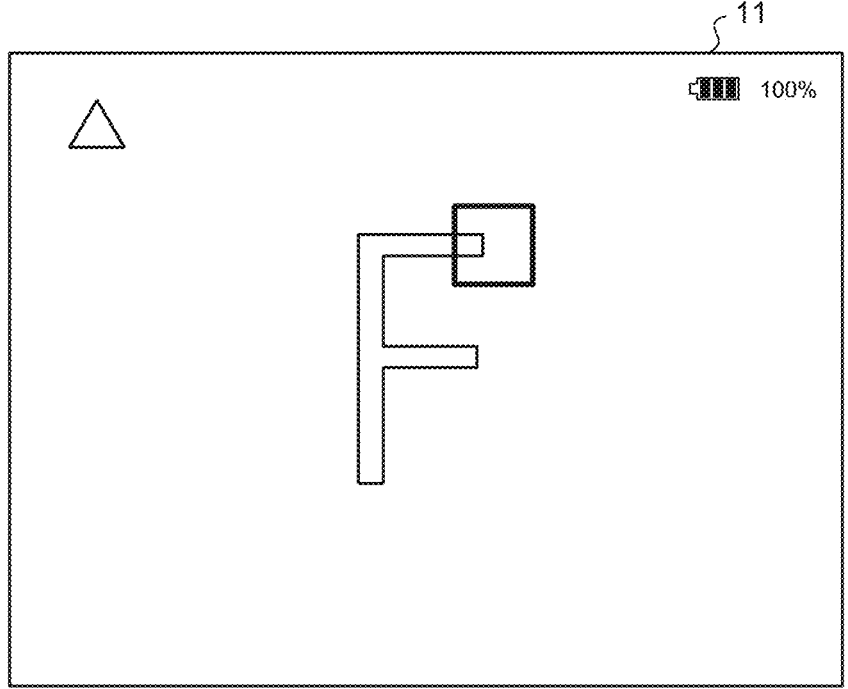
FIG. 7 is an explanatory diagram of display contents of the sub screen.
FIG. 8 is a diagram illustrating a display example of the sub screen during still image shooting.
Figure 9:
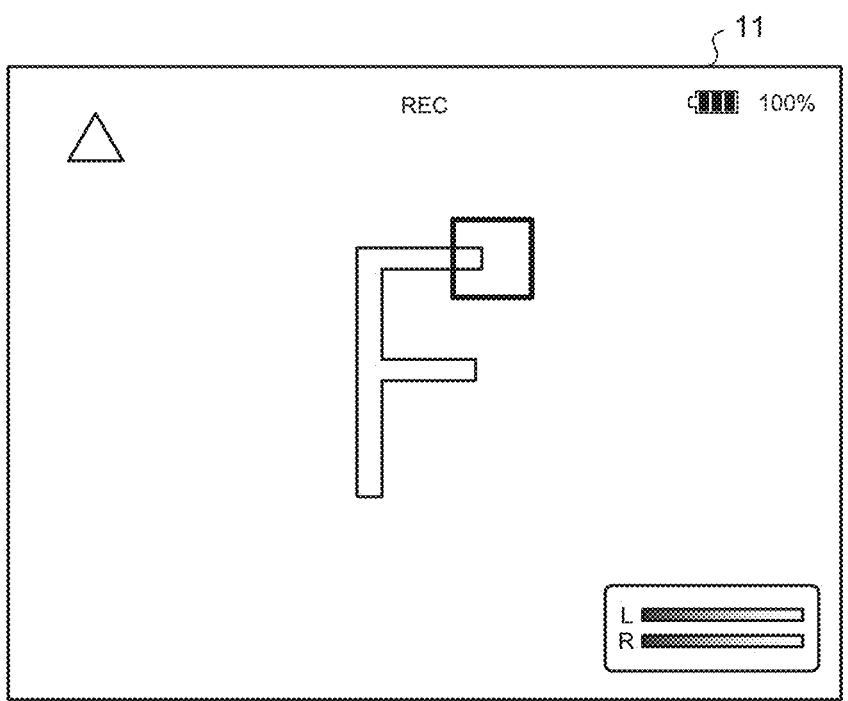
FIG. 9 is a diagram illustrating a display example of the sub screen during moving image shooting.

FIG. 7 is an explanatory diagram of display contents of the sub screen. Also, FIG. 8 is a diagram illustrating a display example of the sub screen during still image shooting. Also, FIG. 9 is a diagram illustrating a display example of the sub screen during moving image shooting. Note that "F" illustrated in FIGS. 8 and 9 schematically represents a subject, and the same applies to FIGS. 11 and 12 described below.

The sub display 10 displays a sub screen including various types of information illustrated in FIG. 7 based on display control of the smartphone 100. For example, FIG. 8 illustrates an example in which, at the time of still image shooting, the sub display 10 displays, on the display unit 11, a sub screen including a camera-through image including a subject, a focus frame indicated by a thick rectangle in the drawing, a remaining amount of the battery of the smartphone 100, and a high temperature detection mark indicated by a triangle in the drawing.

Furthermore, for example, FIG. 9 illustrates an example in which the sub display 10 displays a sub screen including a Rec status and an Audio level on the display unit 11 in addition to the display content of FIG. 8 at the time of moving image shooting.

<4-2. Display Example on Smartphone Side>

Figure 10:
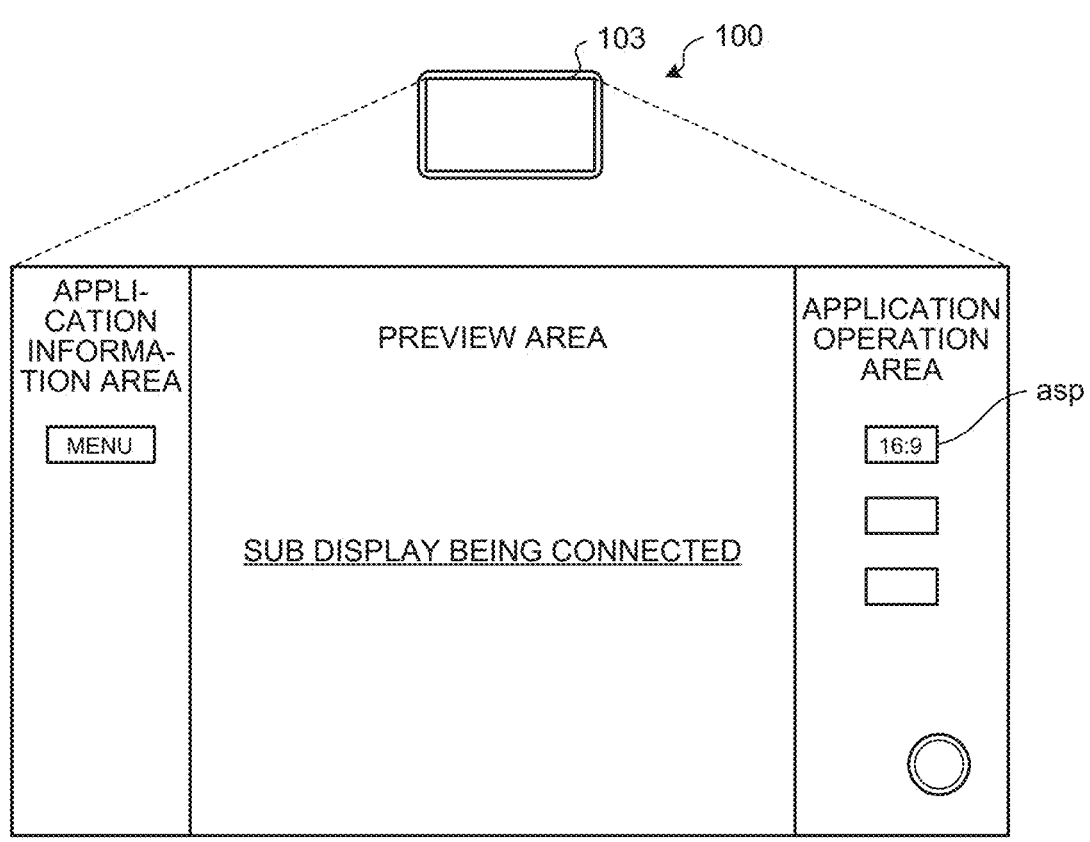
FIG. 10 is a diagram illustrating a display example on the smartphone side when the sub display is connected.

Meanwhile, while the sub display 10 is connected to the smartphone 100, and the sub screen is displayed on the sub display 10, a screen with the following display contents is displayed on the display unit 103 of the smartphone 100. FIG. 10 is a diagram illustrating a display example on the smartphone 100 side when the sub display 10 is connected.

As illustrated in FIG. 10, while the sub screen is displayed on the sub display 10, the smartphone 100 sets a preview area in which the camera-through image is displayed when the sub display 10 is not connected to, for example, black, and then displays a message such as "sub display being connected" on the display unit 103.

Note that, as illustrated in FIG. 10, for an application operation area and the application information area, it is possible to display operation components of a camera application that can be operated on the smartphone 100 side even when the sub display 10 is connected.

<4-3. Display Example of Sub Screen During Change of Aspect Ratio>

For example, FIG. 10 illustrates an example in which an aspect ratio change button asp is displayed. A display example in a case where the aspect ratio change button asp is operated is described.

Figure 11:
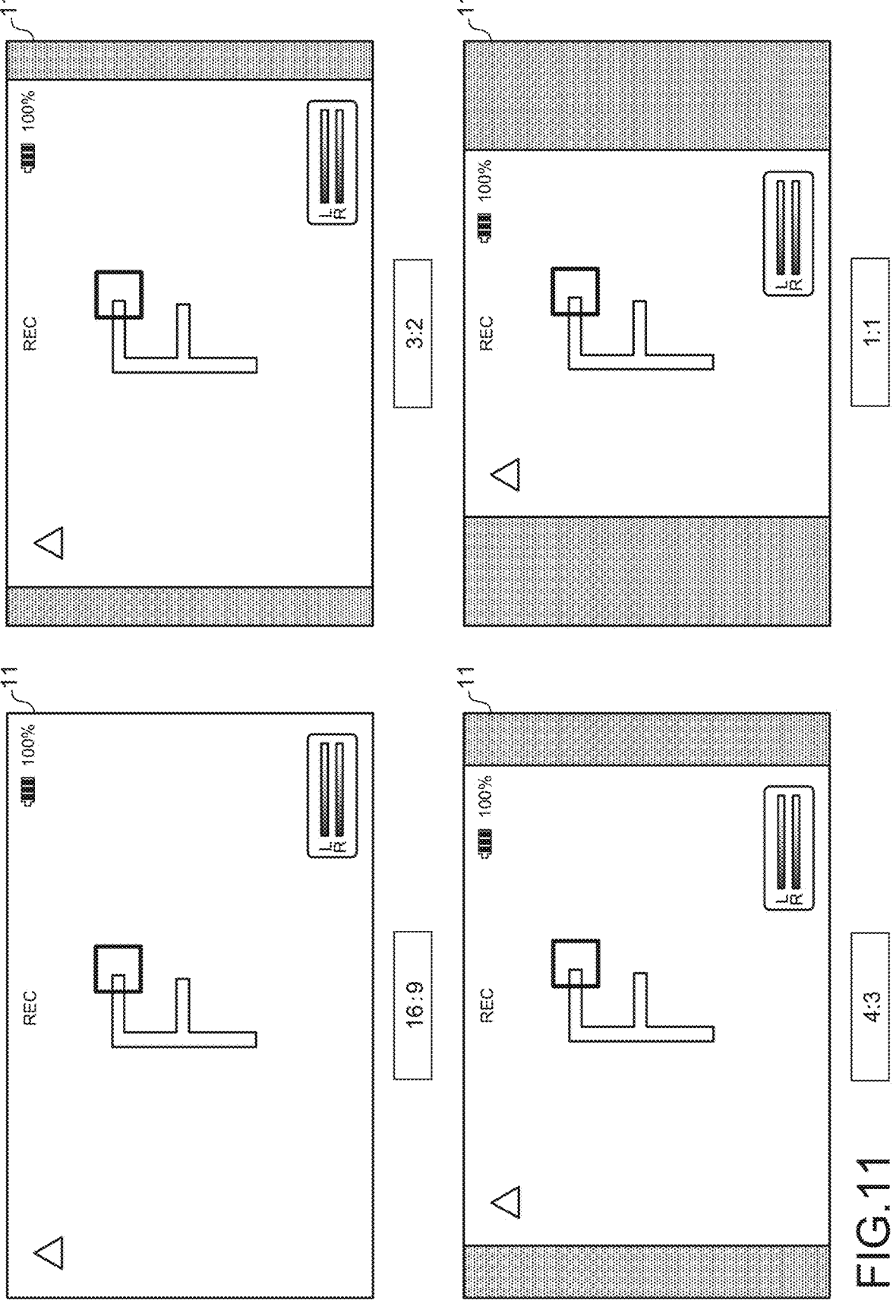
FIG. 11 is a diagram illustrating a display example of the sub screen when an aspect ratio is changed.

FIG. 11 is a diagram illustrating a display example of the sub screen when the aspect ratio is changed. In a case where the aspect ratio change button asp is operated, as illustrated in FIG. 11, the sub display 10 can display the sub screen on the display unit 11 while switching the aspect ratio at each ratio such as "16:9", "3:2", "4:3", and "1:1" based on the display control of the smartphone 100.

<4-4. Display Example of Sub Screen During Operation of Flip Key>

Figure 12:
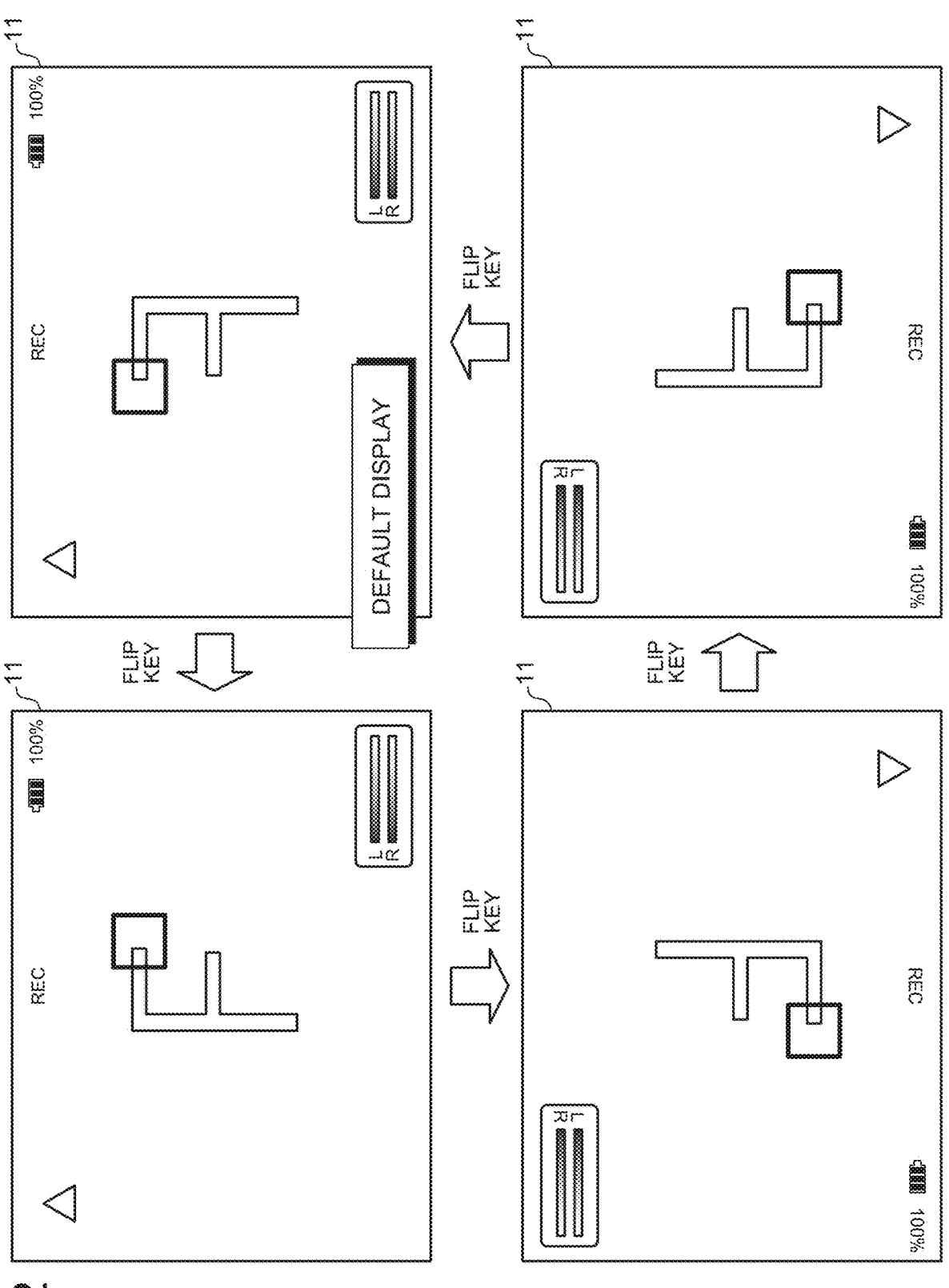
FIG. 12 is a diagram illustrating a display example of the sub screen at the time of operating a flip key.

Next, a display example of the sub screen at the time of operating the flip key 16 is described. FIG. 12 is a diagram illustrating a display example of the sub screen at the time of operating the flip key 16.

In the arrangement state of each device illustrated in FIG. 1, it is described above that the external display system 1 provides a self-portrait photograph function via a camera application, and the sub display 10 functions as a camera through monitor for such a self-portrait photograph function.

Normally, when a self-portrait photograph is captured by using the in-camera of the smartphone 100, a horizontally flipped (that is, mirroring) camera-through image is displayed in the preview area by default. Therefore, it is preferable that the same display is performed on the sub screen displayed on the sub display 10 according to the embodiment of the present disclosure from the viewpoint of the operability of the user.

Therefore, the sub display 10 performs similar display for the camera-through image based on the display control of the smartphone 100. However, each GUI displayed together with the camera-through image may be excluded from the target.

Specifically, when USB connection is established with the smartphone 100, and the display port is opened by the identification code "show", the sub display 10 displays a sub screen in which a camera-through image is horizontally flipped by default as illustrated in the upper right of FIG. 12.

However, at this time, GUIs such as a high temperature detection mark, a remaining amount of the battery of the smartphone 100, a Rec status, and an audio level are not set as horizontally flipping target. The focus frame is set as a horizontally flipping target.

Then, when the flip key 16 is pressed, the camera-through image and the focus frame are horizontally flipped as illustrated in the upper left of FIG. 12. However, also here, GUIs such as a high temperature detection mark, a remaining amount of the battery of the smartphone 100, a Rec status, and an audio level are not set as horizontally flipping targets.

This is because, when the high temperature detection mark, the remaining amount of the battery of the smartphone 100, the Rec status, the Audio level, and the like are horizontally flipped, the shape of each GUI, the direction of the indicator of each level, characters, and the like are reversed, meaning is less likely to be conveyed to the user, and usability is deteriorated.

Note that, when the flip key 16 is subsequently pressed, the sub screen is rotated by 180 degrees as illustrated in the lower left of FIG. 12. At this time, regarding the 180-degree rotation, each GUI other than the above-described horizontally flipping target is also the target.

Then, when the flip key 16 is further pressed, as illustrated in the lower right of FIG. 12, the camera-through image and the focus frame are horizontally flipped from the lower left sub screen. Here, the GUIs other than the above-described horizontally flipping target are also not the horizontally flipping target.

Then, when the flip key 16 is further pressed, the sub screen is rotated by 180 degrees and returns to the default display as illustrated in the upper right of FIG. 12.

Note that, in the description using FIG. 12, an example is described in which the sub screen is flipped or rotated by the flip key 16, but the present disclosure is not limited thereto, and for example, the sub screen may be flipped or rotated according to a sensor value of an acceleration sensor mounted on the smartphone 100, similarly to the case illustrated in FIG. 12.

In addition, for example, after the sub display 10 includes the acceleration sensor, the sub screen may be flipped or rotated according to the sensor value of the acceleration sensor of the sub display 10 as illustrated in FIG. 12.

Note that the input by the flip key 16 and the acquisition of the sensor value of the acceleration sensor can also be regarded as the occurrence of a predetermined event related to the horizontal flip or the vertical rotation of the sub screen.

5. Each Processing Sequence

Next, each processing sequence executed by the external display system 1 is described. For easy understanding of the description, contents of each processing sequence described below are provided in FIG. 13. FIG. 13 is an explanatory diagram of the contents of each processing sequence. An "explanatory diagram" in the drawing is a corresponding diagram when each processing sequence is described.

<5-1. Camera Application Start→Sub Display Connection>

Figure 14:
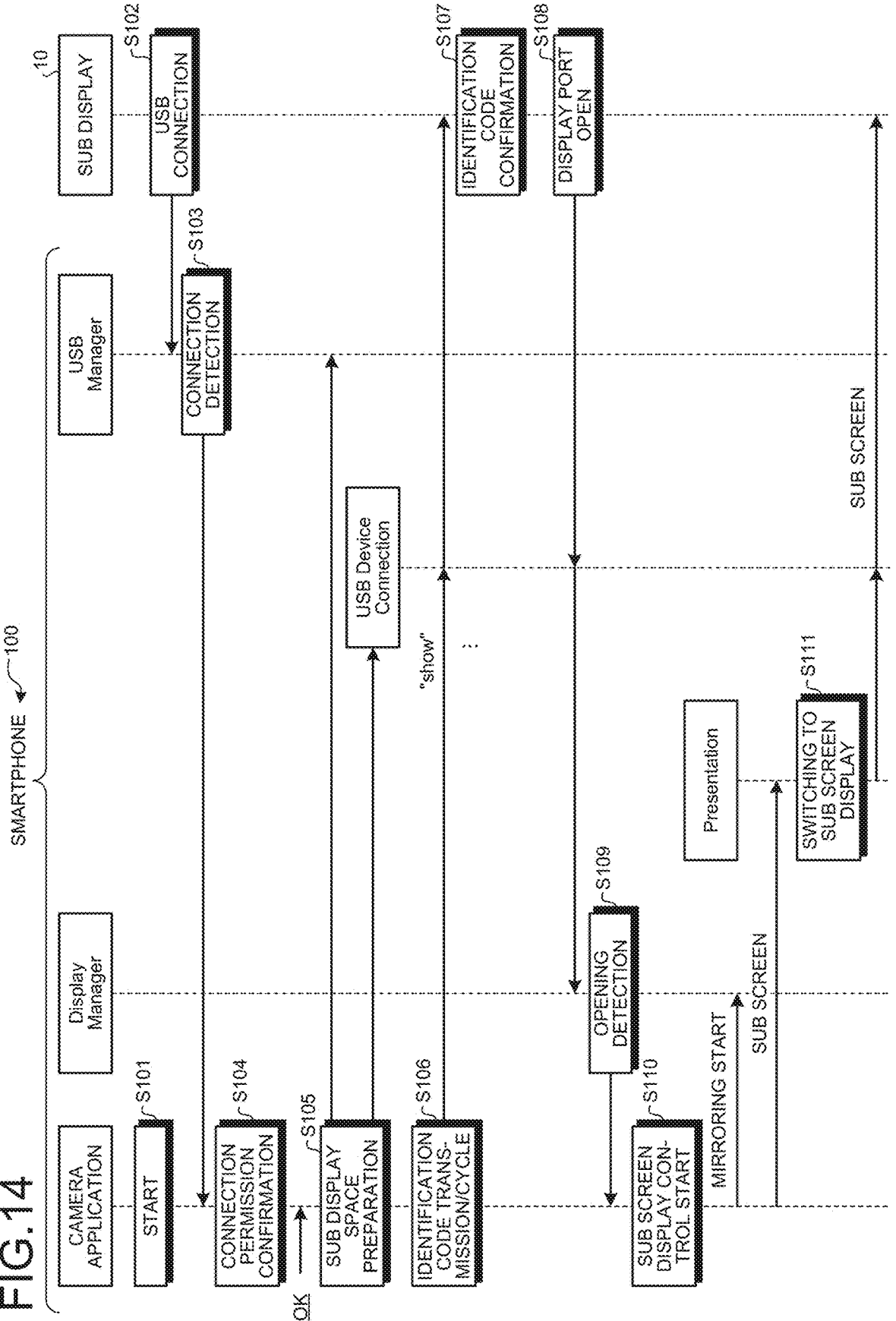
FIG. 14 is a processing sequence in a case where the sub display is connected after the camera application is started.

FIG. 14 is a processing sequence in a case where the sub display 10 is connected after the camera application is started. The "Display Manager" in the drawing refers to a monitoring process of each display connected to the smartphone 100. A "USB Manager" refers to a monitoring process of a USB port, in the embodiment of the present disclosure, the communication unit 102. These monitoring processes correspond to middleware that resides and is executed in the control unit 18.

Also, "USB Device Connection" in the drawing indicates communication connection established between the smartphone 100 and the sub display 10. Also, "Presentation" corresponds to a part of the function of the application execution unit 106a and performs switching to the sub screen display for displaying the sub screen on the sub display 10.

As illustrated in FIG. 14, it is assumed that a camera application is first started (Step S101). It is assumed that the sub display 10 is connected via USB (Step S102).

Then, the USB manager detects the connection (Step S103) and notifies the camera application of the connection. The camera application that receives such a notification performs connection permission confirmation (Step S104).

Figure 15:
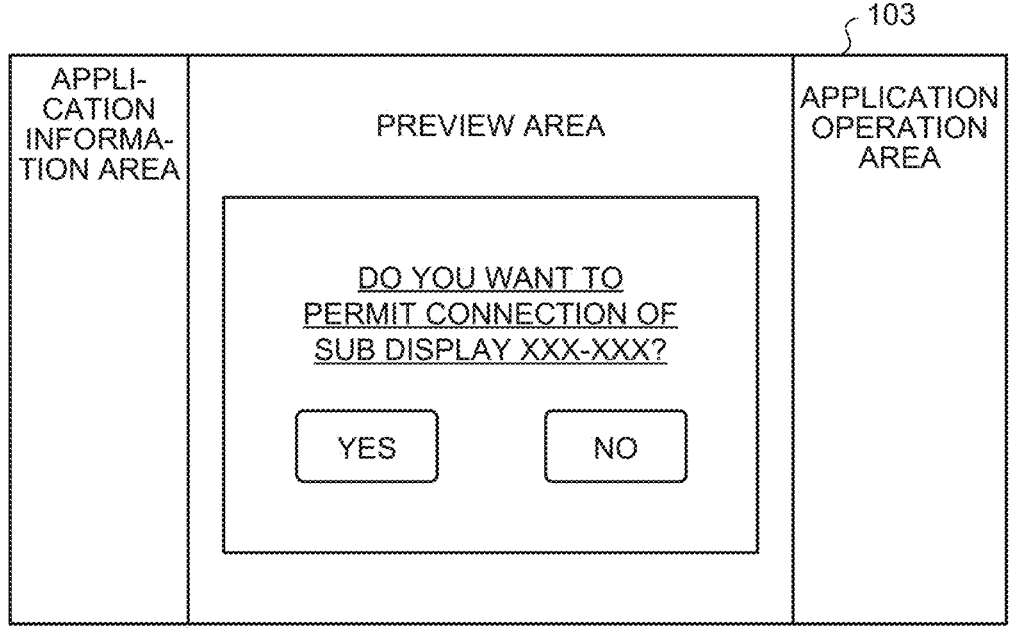
FIG. 15 is a diagram illustrating a confirmation example of connection permission confirmation.

FIG. 15 is a diagram illustrating a confirmation example of connection permission confirmation. The camera application displays a dialog as illustrated in FIG. 15 on the camera application screen of the display unit 103 and receives the confirmation of the user. If "Yes", the sub display 10 is connected. If "No", the sub display 10 is not connected. Here, it is assumed that "Yes" is input.

The description returns to FIG. 14. Then, the camera application prepares a sub display space (Step S105). The sub display space is a virtual space for displaying the sub screen and is also referred to as a "surface".

The camera application generates the sub display space in Step S105 and thereafter outputs the sub display space to display the sub screen on the sub display 10 via the USB device connection.

Then, the camera application transmits the identification code "show" to the sub display 10 at a predetermined cycle (Step S106). When the identification code "show" is confirmed (Step S107), the sub display 10 opens the display port (Step S108).

Then, the Display Manager detects the opening of the port (Step S109) and notifies the camera application of the opening. The camera application that receives this notification starts display control of the sub screen (Step S110) and starts mirroring. Then, a sub screen is output.

In response to the output, the presentation is switched to the sub screen display (Step S111), and the sub screen is transmitted to the sub display 10 via the USB device connection. Note that the procedure after Step S105 can be performed by using, for example, an application programming interface (API) of an open graphics library (OpenGL) system.

<5-2. Sub Display Connection-Camera Application Start>

Next, FIG. 16 is a processing sequence in a case where the camera application is started after the sub display 10 is connected.

As illustrated in FIG. 16, first, it is assumed that the sub display 10 is connected via USB (Step S201). Then, the USB manager detects such connection (Step S202).

Then, it is assumed that the camera application is started (Step S203). Then, the camera application exchanges the presence or absence of connection with the USB manager and performs connection permission confirmation in a case where the sub display 10 is connected (Step S204). Step S204 is similar to Step S104 described above. Thereafter, a processing sequence similar to that in Step S104 is executed.

<5-3. Connected→Camera Application End>

Figure 17:
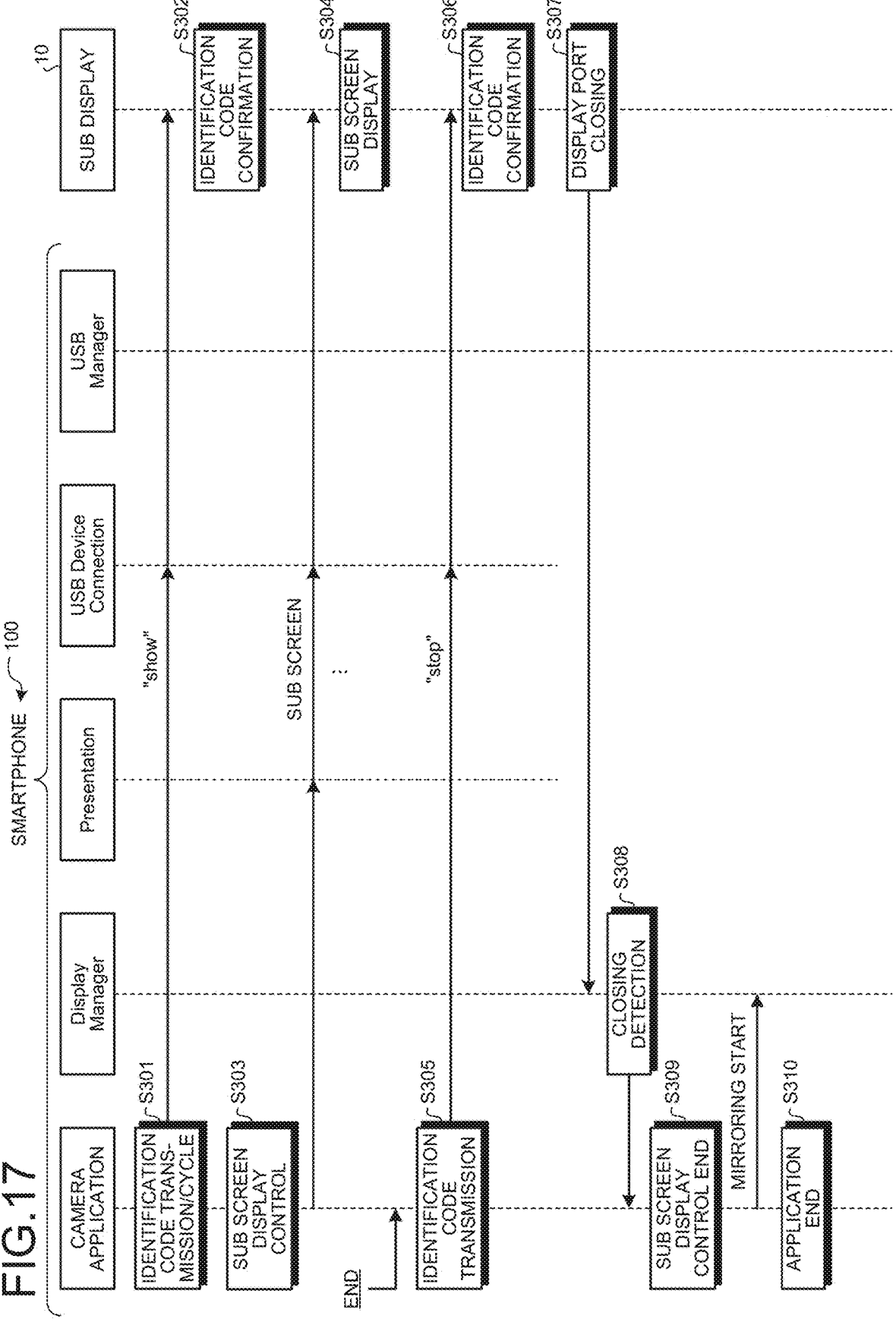
FIG. 17 is a processing sequence in a case where the camera application is ended while the sub display is connected.

Next, FIG. 17 is a processing sequence in a case where the camera application is ended while the sub display 10 is connected.

As illustrated in FIG. 17, during connection of the sub display 10, the camera application transmits the identification code "show" to the sub display 10 for each predetermined cycle (Step S301), and the sub display 10 confirms the identification code "show" (Step S302). Then, while "show" can be confirmed, the sub display 10 opens the display port.

Meanwhile, the camera application appropriately performs display control of the sub screen (Step S303), transmits the sub screen to the sub display 10, and the sub display 10 that receives the sub screen displays the sub screen (Step S304).

Then, for example, when receiving an end operation of the user, the camera application transmits an identification code "stop" to the sub display 10 (Step S305). When receiving and confirming such "stop" (Step S306), the sub display 10 closes the display port (Step S307).

Then, the Display Manager detects the closing of the port (Step S308) and notifies the camera application of the closing. The camera application that receives this notification ends the display control of the sub screen (Step S309), starts mirroring, and ends the camera application (Step S310).

<5-4. Connected→Sub Display Disconnection>

Figure 18:
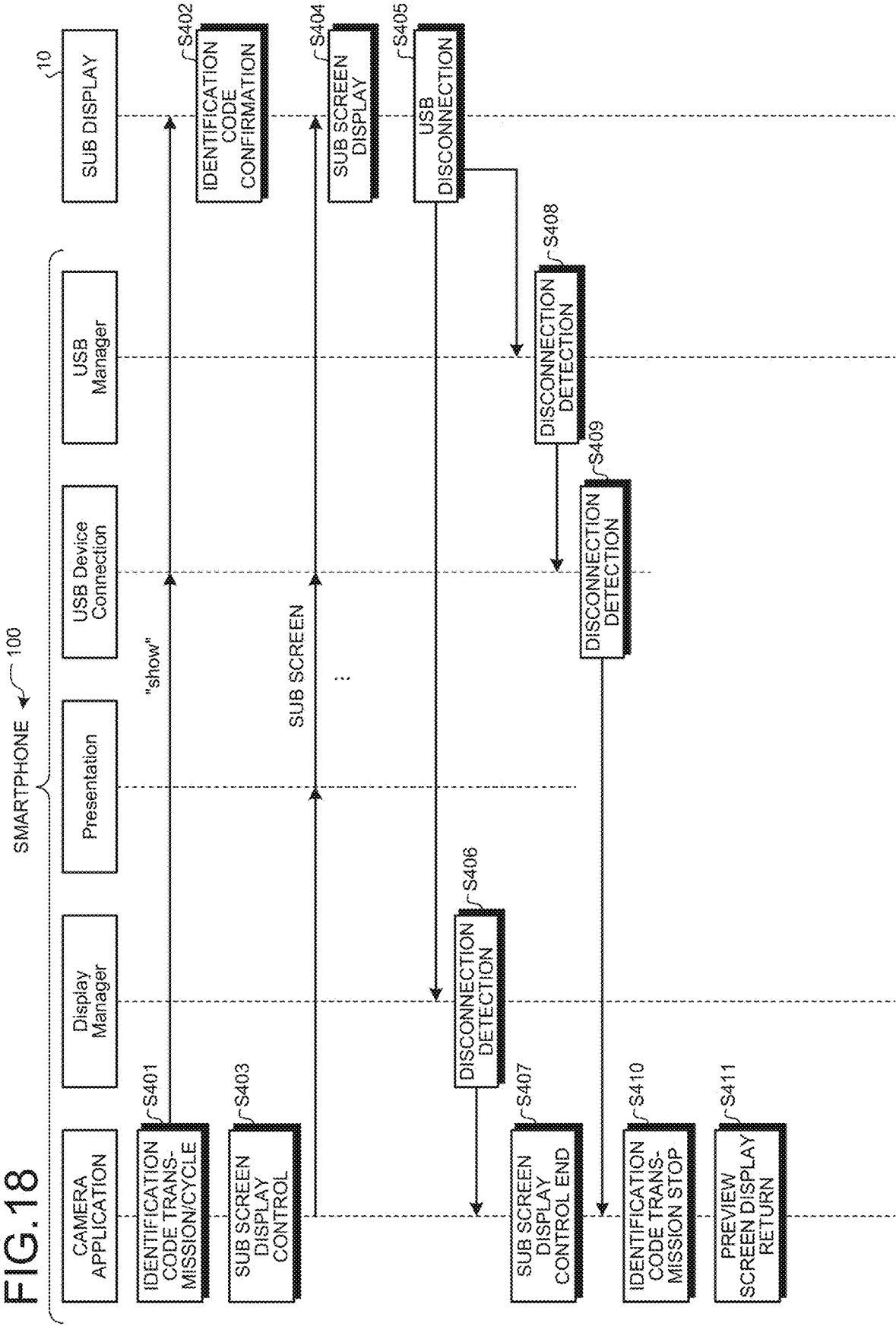
FIG. 18 is a processing sequence in a case where the connection of the sub display is disconnected while the sub display is connected.

Next, FIG. 18 is a processing sequence in a case where the connection of the sub display 10 is disconnected while the sub display 10 is connected. Note that, since Steps S401 to S404 in FIG. 18 are similar to Steps S301 to S304 in FIG. 17, the processing sequence from Step S405 is described here.

As illustrated in FIG. 18, it is assumed that the connection of the sub display 10 is disconnected during the connection of the sub display 10 (Step S405). Then, the Display Manager detects the disconnection (Step S406) and notifies the camera application of the disconnection.

The camera application that receives such notification ends the display control of the sub screen (Step S407). Meanwhile, disconnection is also detected in the USB manager (Step S408), and the USB device connection also detects the disconnection (Step S409).

Then, the camera application stops transmission of the identification code (Step S410) and displays the camera-through image on the display unit 103 of the smartphone 100. That is, the camera application returns preview screen display on the display unit 103 of the smartphone 100 (Step S411).

<5-5. Connected→Sub Display Off/On>

Figure 19:
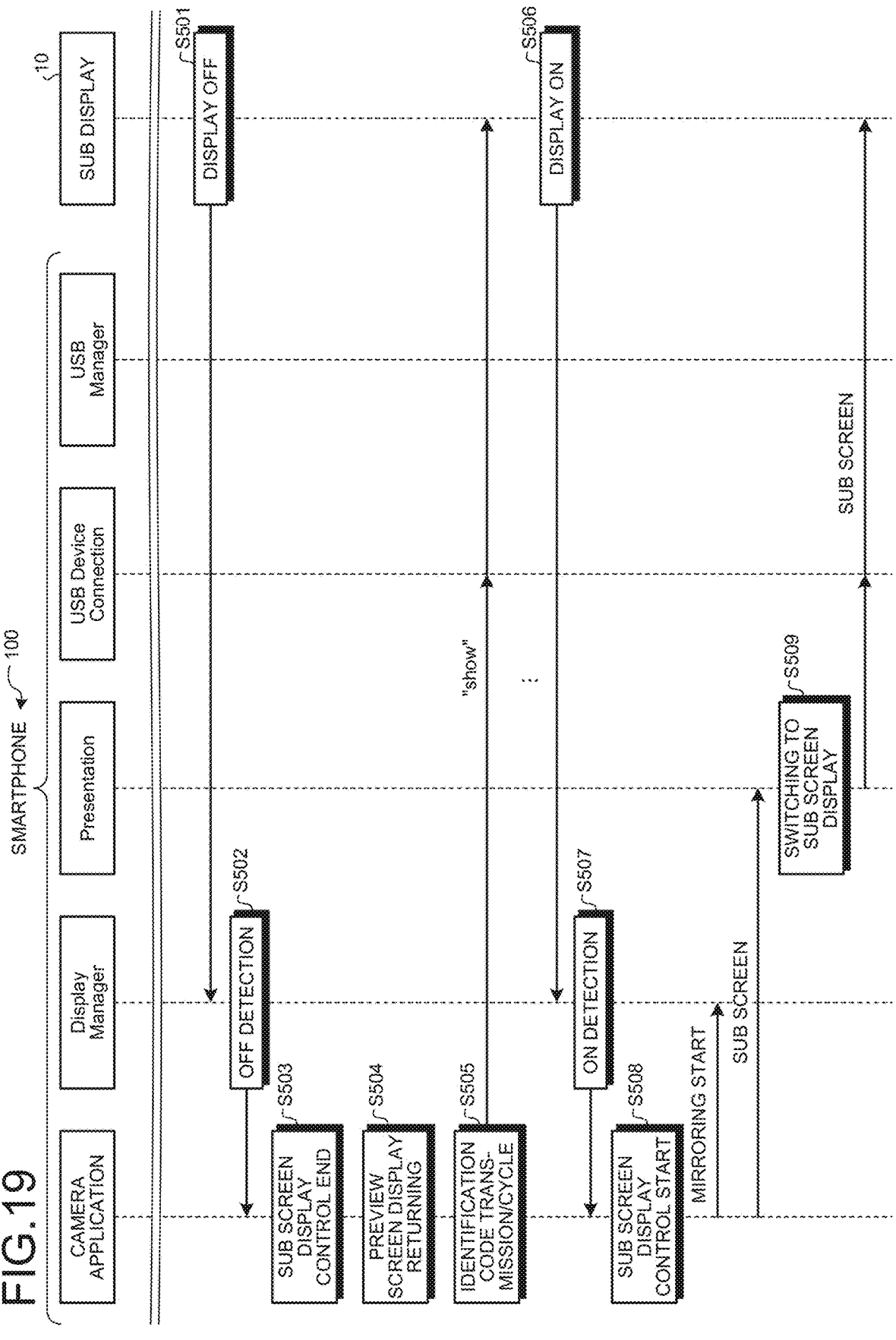
FIG. 19 is a processing sequence in a case where the sub display is turned on/off while the sub display is connected.

Next, FIG. 19 is a processing sequence in a case where the sub display 10 is turned on/off while the sub display 10 is connected.

As illustrated in FIG. 19, it is assumed that the display unit 11 of the sub display 10 is turned off by the on/off switch 15 during the connection of the sub display 10 (Step S501).

Then, the Display Manager detects the display-off (Step S502) and notifies the camera application of the display-off. The camera application that receives this notification ends the display control of the sub screen (Step S503) and returns the preview screen display on the display unit 103 of the smartphone 100 (Step S504).

Meanwhile, the camera application transmits the identification code "show" to the sub display 10 at a predetermined cycle (Step S505).

Then, when the display unit 11 of the sub display 10 is turned on by the on/off switch 15 (Step S506), the Display Manager detects such display-on (Step S507) and notifies the camera application of the display-on.

The camera application that receives this notification starts display control of the sub screen (Step S508) and starts mirroring. Then, a sub screen is output.

In response to the output, the presentation is switched to the sub screen display (Step S509), and the sub screen is transmitted to the sub display 10 via the USB device connection.

<5-6. Connected→Pause/Resume of Smartphone>

Figure 20:
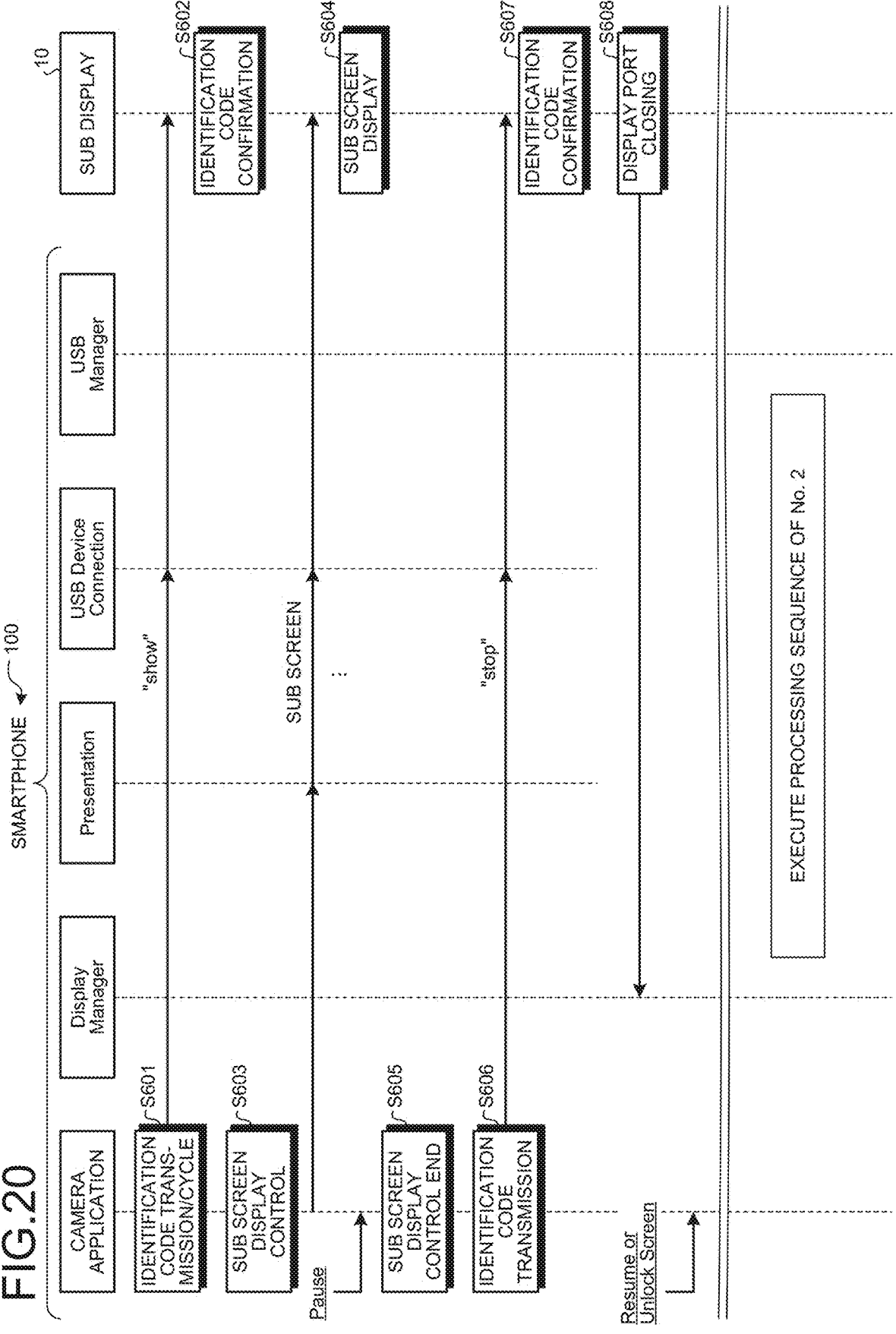
FIG. 20 is a processing sequence in a case where the smartphone pauses/resumes while the sub display is connected.

Next, FIG. 20 is a processing sequence in a case where the smartphone 100 pauses/resumes while the sub display 10 is connected. Note that, since Steps S601 to S604 in FIG. 20 are similar to Steps S301 to S304 in FIG. 17, the processing sequence from Step S605 is described here.

As illustrated in FIG. 20, it is assumed that a Pause operation is performed in the smartphone 100 while the sub display 10 is connected (see "Pause" in the drawing). Then, the camera application ends the display control of the sub screen (Step S605) and transmits the identification code "stop" toward the sub display 10 (Step S606).

The sub display 10 receives and confirms such "stop" (Step S607) and closes the display port (Step S608).

Then, it is assumed that an operation of Resume or Unlock Screen is performed on the smartphone 100 in such a state (see "Resume or Unlock Screen" in the drawing). Then, thereafter, the processing sequence No. 2 illustrated in FIG. 13, that is, the processing sequence in a case where the camera application is started after the sub display 10 is connected, as illustrated in FIG. 16, is executed.

<5-7. Connected→External Power Supply Disconnection>

Figure 21:
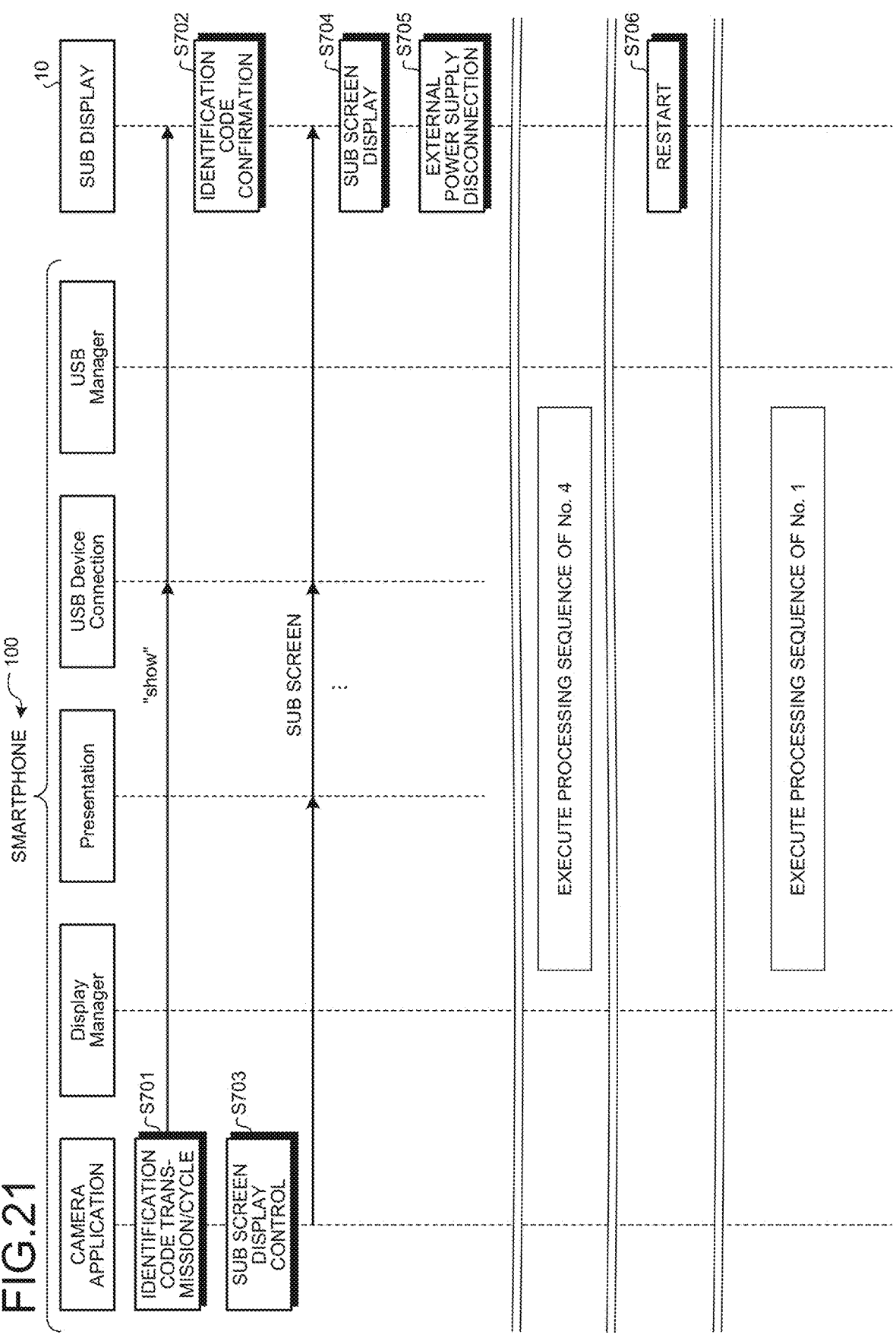
FIG. 21 is a processing sequence in a case where the external power supply is disconnected while the sub display is connected.

Next, FIG. 21 is a processing sequence in a case where the external power supply 70 is disconnected while the sub display 10 is connected. Note that, since Steps S701 to S704 in FIG. 21 are similar to Steps S301 to S304 in FIG. 17, the processing sequence from Step S705 is described here.

As illustrated in FIG. 21, it is assumed that the external power supply 70 connected to the sub display 10 is disconnected while the smartphone 100 is connected to the sub display 10 (Step S705). Then, the processing sequence No. 4 illustrated in FIG. 13, that is, the processing sequence in a case where the connection of the sub display 10 is disconnected while the sub display 10 is connected, as illustrated in FIG. 18, is executed.

Thereafter, the sub display 10 is restarted (Step S706). Then, thereafter, the processing sequence No. 1 illustrated in FIG. 13, that is, the processing sequence in a case where the sub display 10 is connected after the camera application is started, as illustrated in FIG. 14, is executed.

<5-8. Connected→Battery Shortage>

Figure 22:
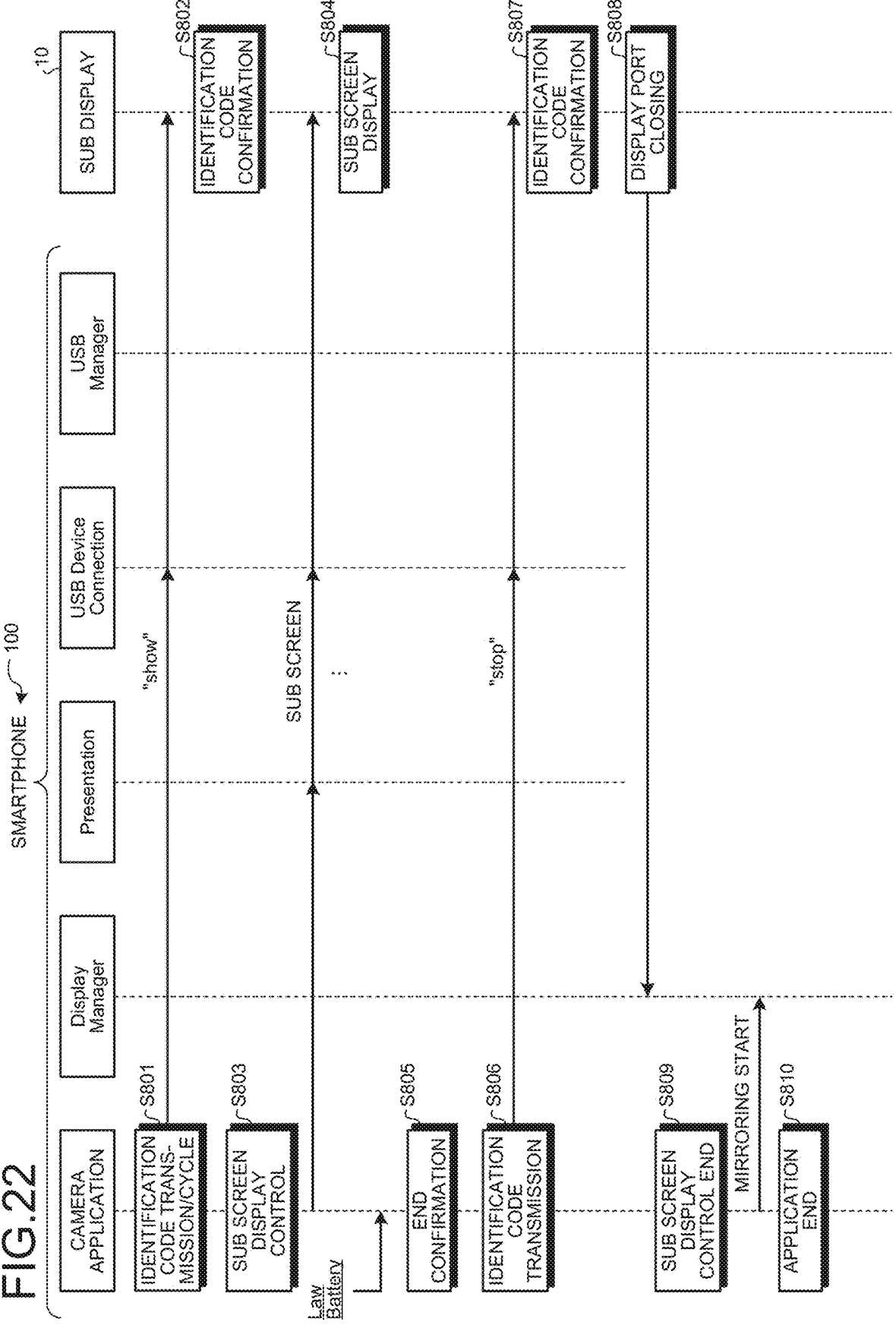
FIG. 22 is a processing sequence in a case where the remaining amount of the battery of the smartphone is insufficient while the sub display is connected.

Next, FIG. 22 is a processing sequence in a case where the remaining amount of the battery of the smartphone 100 is insufficient while the sub display 10 is connected. Note that, since Steps S801 to S804 in FIG. 22 are similar to Steps S301 to S304 in FIG. 17, the processing sequence from Step S805 is described here.

As illustrated in FIG. 22, it is assumed that the camera application detects a battery shortage of the smartphone 100 while the sub display 10 is connected (see "Law Battery" in FIG. 22).

Figure 23:
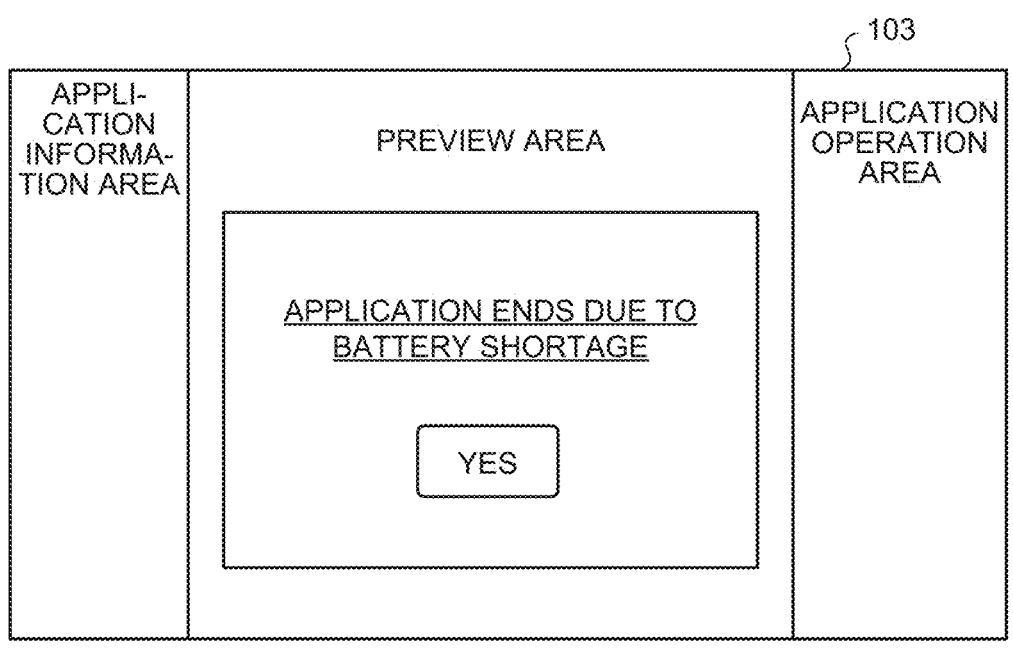
FIG. 23 is a diagram illustrating a confirmation example of end confirmation.

Then, the camera application performs end confirmation (Step S805). FIG. 23 is a diagram illustrating a confirmation example of end confirmation. The camera application displays a dialog as illustrated in FIG. 23 on the camera application screen of the display unit 103 and receives the confirmation of the user.

The description returns to FIG. 22. When receiving the confirmation of the user, the camera application transmits an identification code "stop" to the sub display 10 (Step S806). The sub display 10 receives and confirms such "stop" (Step S807) and closes the display port (Step S808).

Also, the camera application ends the display control of the sub screen (Step S809), starts mirroring, and ends the camera application (Step S810).

<5-9. Connected→Forced End of Camera Application>

Figure 24:
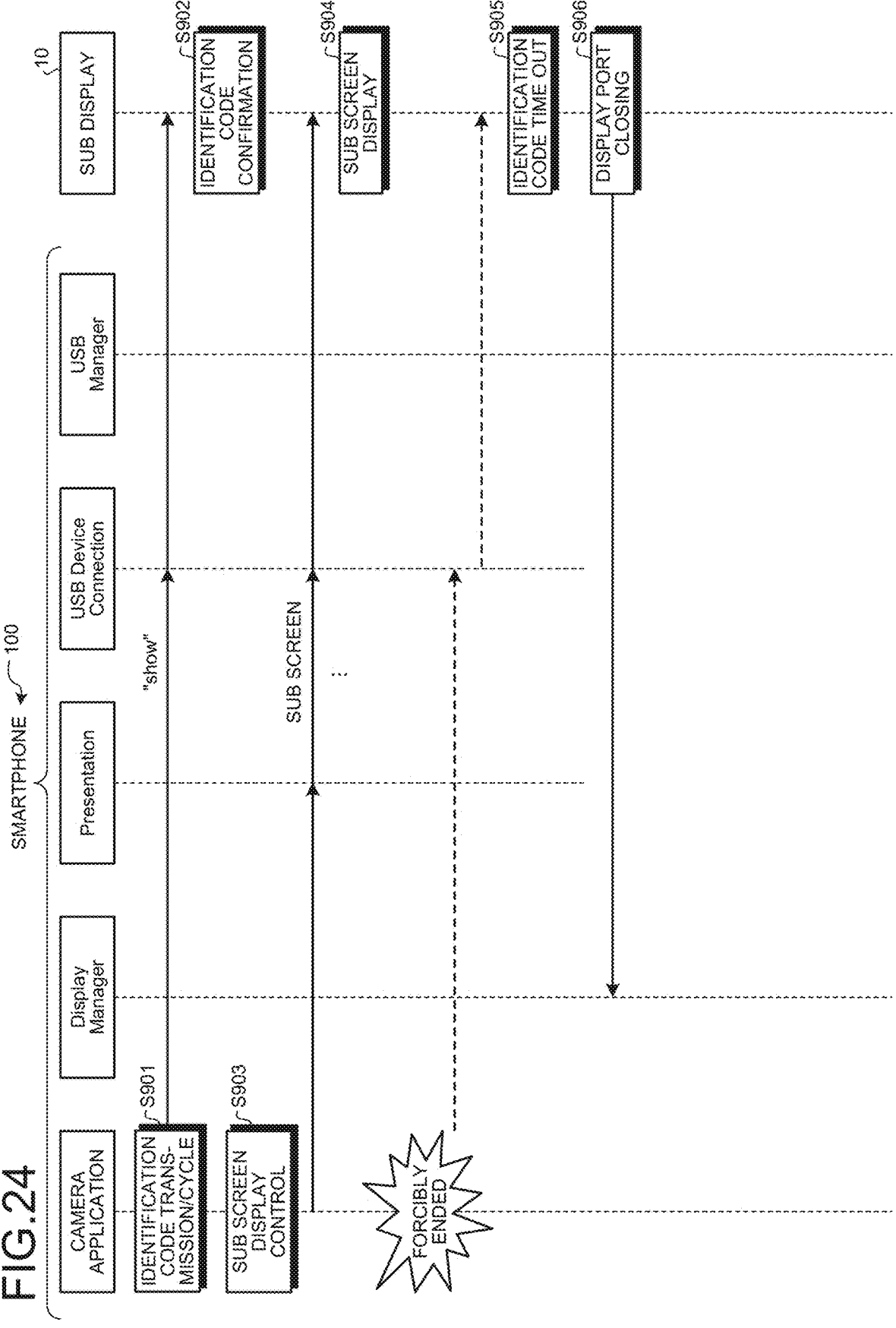
FIG. 24 is a processing sequence in a case where the camera application is forcibly ended while the sub display is connected.

Next, FIG. 24 is a processing sequence in a case where the camera application is forcibly ended while the sub display 10 is connected. Note that, since Steps S901 to S904 in FIG. 24 are similar to Steps S301 to S304 in FIG. 17, the processing sequence from Step S905 is described here.

As illustrated in FIG. 24, it is assumed that the camera application is unexpectedly forcibly ended while the sub display 10 is connected. In such a case, transmission of the identification code "show" is also forcibly ended, but the sub display 10 determines timeout of the identification code "show", and when the identification code "show" is not arrived for 1000 msec, for example, the sub display 10 detects timeout (Step S905).

Also, when timeout is detected, the sub display 10 closes the display port (Step S906).

6. Modifications

Meanwhile, the above-described embodiments of the present disclosure can include some modifications.

<6-1. First Modification>

In the embodiment of the present disclosure described above, as illustrated in FIG. 1, a case where the sub display 10 functions as a camera through monitor for a self-portrait photograph function and is substituted for the display unit 103 of the smartphone 100 is described as an example, but the present disclosure is not limited thereto.

For example, the display unit 103 of the smartphone 100 may function as a display device for a main screen for a camera application, and the sub display 10 may be used merely as an auxiliary display device.

Figure 25:
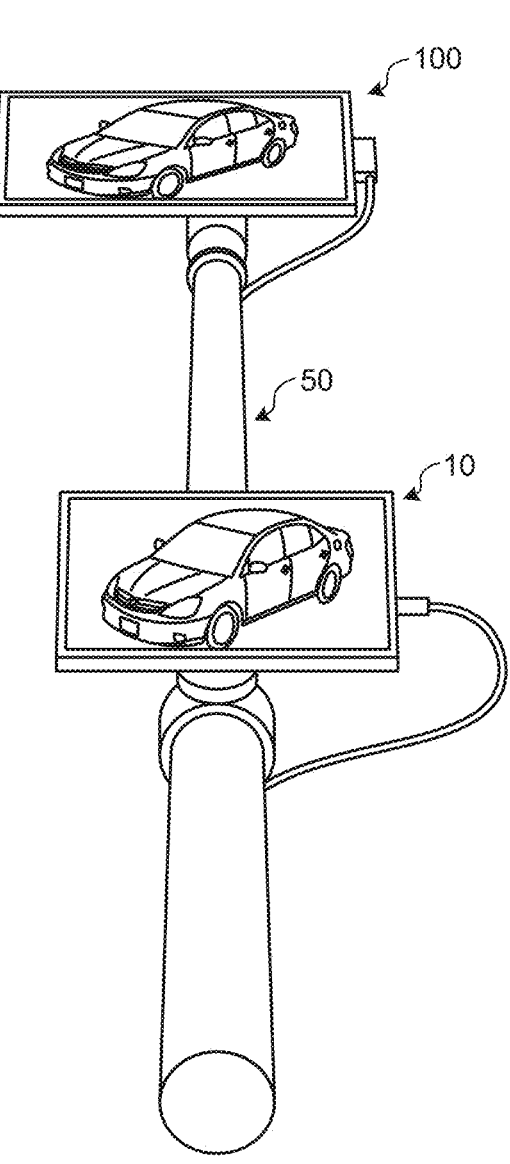
FIG. 25 is an explanatory diagram (part 1) of a first modification.
Figures 26, 27:
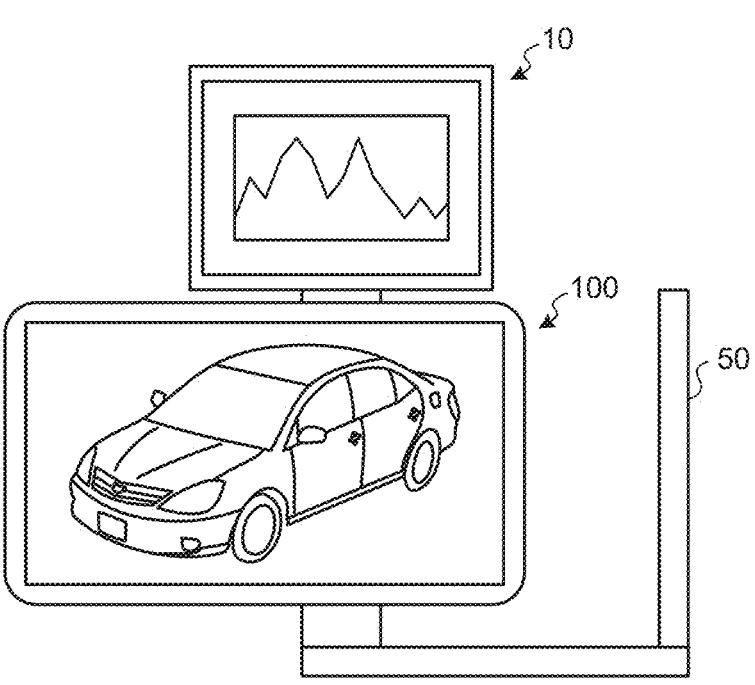
FIG. 26 is an explanatory diagram (part 2) of the first modification.
FIG. 27 is an explanatory diagram of a second modification.

FIG. 25 is an explanatory diagram (part 1) of the first modification. Also, FIG. 26 is an explanatory diagram (part 2) of the first modification.

As illustrated in FIG. 25, the holding portion 50 may have a longer dimension than the case of FIG. 1. In addition, the smartphone 100 may be held at a position close to the distal end of the holding portion 50, and the sub display 10 may be held at a position close to the hand of the user.

Furthermore, at this time, the smartphone 100 may be arranged such that the display surface of the display unit 103 faces the user, similarly to the sub display 10. Therefore, in this case, the out-camera 101$a$ of the smartphone 100 faces the subject with respect to the user.

In such a configuration, by raising the holding portion 50, the user can position the out-camera 101$a$ at a position higher than usual and perform shooting other than a self-portrait photograph via the camera application by using the remote controller 50$a$ (not illustrated) or the like.

Note that, by positioning the out-camera 101$a$ at a position higher than usual, it is difficult for the user to see the display unit 103 of the smartphone 100. However, as illustrated in FIG. 25, by displaying the camera-through image supplementarily on the sub display 10 close to the hand, the user can perform shooting while confirming the camera-through image.

Incidentally, in the case of the configuration example illustrated in FIG. 25, the default display of the sub display 10 is different from that illustrated in FIG. 12 and is not for a self-portrait photograph, that is, the camera-through image, the focus frame, and the like are not horizontally flipped, as illustrated in FIG. 26.

As described above, by using the sub display 10 as an auxiliary display device in a case where it is difficult to see the smartphone 100, it is possible to enhance the convenience of the user including the ease of viewing and the like.

<6-2. Second Modification>

FIG. 27 is an explanatory diagram of the second modification. Similarly to the first modification, in the configuration in which the display surfaces of the smartphone 100 and the sub display 10 are arranged to face the user, the sub display 10 may be configured as a dedicated device that supplementarily displays, for example, a histogram of shoot data.

As described above, by using the sub display 10 as a display device that displays image information that cannot be displayed on the smartphone 100 having a limited display area in an expanded manner, it is possible to enhance the convenience of the user including the ease of viewing and the like.

<6-3. Third Modification>

Also, in addition to this, for example, the backlight of the sub display 10 may be configured to function instead of the flash light at the time of shooting a self-portrait photograph.

In addition, several patterns of effects at the time of shooting may be prepared and freely selected at the time of shooting.

In addition, the display unit 11 of the sub display 10 may be configured by a touch panel to be able to receive a touch operation, and a place touched by the user may be set as a target of touch tracking.

<6-4. Other Modifications>

Also, among the processes described in the above-described embodiments of the present disclosure, all or a part of the processes described as being performed automatically can be performed manually, or all or a part of the processes described as being performed manually can be performed automatically by a known method. In addition, the processing procedure, specific names, and information including various data and parameters disclosed in the document and the drawings can be arbitrarily changed unless otherwise specified. For example, the various types of information illustrated in each figure are not limited to the illustrated information.

In addition, each component of each device illustrated in the drawings is functionally conceptual and is not necessarily physically configured as illustrated in the drawings. That is, a specific form of distribution and integration of each device is not limited to the illustrated form, and all or a part thereof can be configured to be functionally or physically distributed and integrated in an arbitrary unit according to various loads, usage statuses, and the like.

In addition, the embodiments of the present disclosure described above can be appropriately combined in a region in which the processing contents do not contradict each other. Furthermore, the order of each step illustrated in the sequence diagram or the flowchart according to the present embodiment can be changed as appropriate.

7. Hardware Configuration

Figure 28:
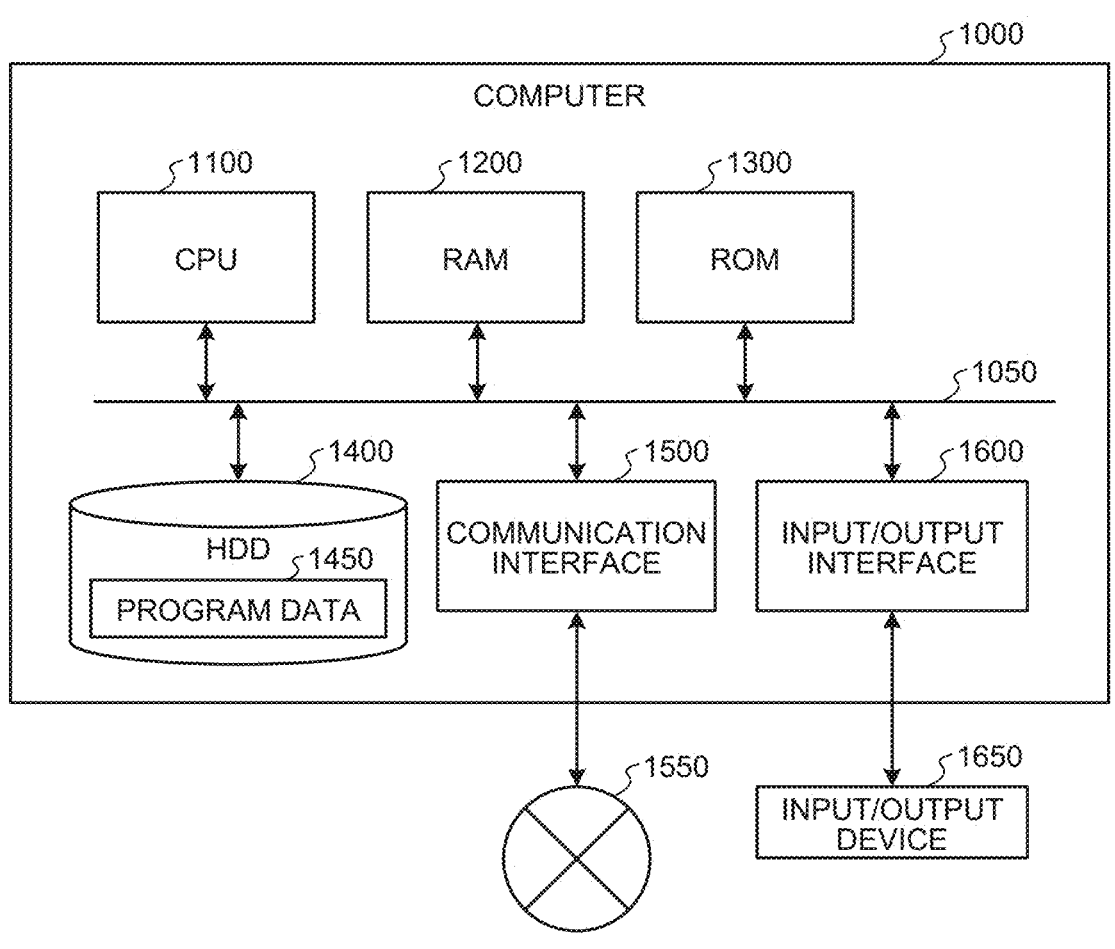
FIG. 28 is a hardware configuration diagram illustrating an example of a computer that implements functions of the smartphone.

The smartphone 100 and the like according to the embodiment of the present disclosure described above are implemented, for example, by a computer 1000 having a configuration as illustrated in FIG. 28. The smartphone 100 is described as an example. FIG. 28 is a hardware configuration diagram illustrating an example of the computer 1000 that implements functions of the smartphone 100. The computer 1000 includes a CPU 1100, a RAM 1200, a ROM 1300, a hard disk drive (HDD) 1400, a communication interface 1500, and an input/output interface 1600. Each unit of the computer 1000 is connected by a bus 1050.

The CPU 1100 operates based on a program stored in the ROM 1300 or the HDD 1400 and controls each unit. For example, the CPU 1100 loads the program stored in the ROM 1300 or the HDD 1400 into the RAM 1200 and executes processing corresponding to various programs.

The ROM 1300 stores a boot program such as a basic input output system (BIOS) executed by the CPU 1100 at the time of starting the computer 1000, a program depending on hardware of the computer 1000, and the like.

The HDD 1400 is a computer-readable recording medium that records a program executed by the CPU 1100, data used by the program, and the like in a non-transitory manner. Specifically, the HDD 1400 is a recording medium that records a program according to the present disclosure which is an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 and the computer 1000. For example, the CPU 1100 receives data from an input device such as a keyboard and a mouse via the input/output interface 1600. In addition, the CPU 1100 transmits data to an output device such as a display, a speaker, or a printer via the input/output interface 1600. Furthermore, the input/output interface 1600 may function as a media interface that reads a program or the like recorded in a predetermined recording medium (media). The medium is, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

For example, when the computer 1000 functions as the smartphone 100 according to the embodiment, the CPU 1100 of the computer 1000 implements the functions of the control unit 106 by executing a program loaded onto the RAM 1200. In addition, the HDD 1400 stores a program according to the present disclosure and data in the storage unit 105. Note that the CPU 1100 reads the program data 1450 from the HDD 1400 and executes the program data, but as another example, these programs may be acquired from another device via the external network 1550.

8. Conclusion

As described above, according to an embodiment of the present disclosure, the sub display 10 (corresponding to an example of an "external display device") includes: the display unit 11 that is detachably provided together with the smartphone 100 (corresponding to an example of an "information processing device") including the camera 101, with respect to the holding portion 50 provided so as to be grippable by the user; the communication control unit 18a that controls communication with the camera application using the camera 101 operating on the smartphone 100; and the display control unit 18c that causes the display unit 11 to display a sub screen (corresponding to an example of an "external display screen") generated by the camera application and received via the communication control unit 18a. As a result, convenience at the time of using the camera application can be improved.

Although each embodiment of the present disclosure has been described above, the technical scope of the present disclosure is not limited to the embodiments described above as it is, and various modifications can be made without departing from the gist of the present disclosure. In addition, components of different embodiments and modifications may be appropriately combined.

Furthermore, the effects of each embodiment described in the present specification are merely examples and are not limited, and other effects may be provided.

Note that the present technology can also have the following configurations.

(1)

An external display device comprising:

a display unit that is detachably provided together with an information processing device including a camera, with respect to a holding portion provided so as to be grippable by a user;

a communication control unit that controls communication with a camera application using the camera operating in the information processing device; and a display control unit that causes the display unit to display an external display screen generated by the camera application and received via the communication control unit.

(2)

The external display device according to (1), wherein the camera is an out-camera, and the display unit is held by the holding portion such that a display surface of the display unit faces the user together with the out-camera.

(3)

The external display device according to (2), wherein the external display screen includes at least a camera-through image of the out-camera, and the display control unit causes the display unit to display by default the external display screen in which the camera-through image is horizontally flipped.

(4)

The external display device according to (3), wherein the external display screen further includes a GUI related to an operation of the camera application, and the display control unit causes the display unit to display the external display screen in which a part of the GUI is excluded from the horizontally flipping target.

(5)

The external display device according to (3), wherein the display control unit causes the display unit to display the external display screen that is horizontally flipped or vertically rotated when a predetermined event related to horizontal flip or vertical rotation occurs.

(6)

The external display device according to any one of (1) to (5), wherein the communication control unit enables display of the external display screen on the display unit by opening a port of the display unit while a specific identification code transmitted at a predetermined cycle is received from the information processing device after communication connection with the information processing device is established.

(7)

The external display device according to (6), wherein the communication control unit disables display of the external display screen on the display unit by closing the port of the display unit when an identification code indicating end of display is received from the information processing device.

(8)

The external display device according to any one of (1) to (7), wherein the external display device is provided to be operable by receiving power supply from the information processing device or an external power supply.

(9)

An information processing device comprising:

a camera that is detachably provided together with an external display device, with respect to a holding portion provided so as to be grippable by a user;

a communication control unit that controls communication with the external display device; and an application execution unit that executes a camera application using the camera and causes the external display device to display an external display screen generated by the camera application and transmitted via the communication control unit.

(10)

An external display method executed by an external display device including a display unit that is detachably provided together with an information processing device including a camera, with respect to a holding portion provided so as to be grippable by a user, the method comprising:

controlling communication with a camera application using the camera operating in the information processing device; and causing the display unit to display an external display screen generated by the camera application and received via the control of the communication.

REFERENCE SIGNS LIST

1 EXTERNAL DISPLAY SYSTEM
10 SUB DISPLAY
11 DISPLAY UNIT
12 FIRST COMMUNICATION UNIT
13 SECOND COMMUNICATION UNIT
14 VOICE INPUT UNIT
15 ON/OFF SWITCH
16 FLIP KEY
17 LUMINANCE KEY
18 CONTROL UNIT
18a COMMUNICATION CONTROL UNIT
18b TRANSMISSION/RECEPTION UNIT
18c DISPLAY CONTROL UNIT
30 MICROPHONE
50 HOLDING PORTION
50a REMOTE CONTROLLER
70 EXTERNAL POWER SUPPLY
100 SMARTPHONE
101 CAMERA
101a OUT-CAMERA
102 COMMUNICATION UNIT
103 DISPLAY UNIT
104 OPERATION UNIT
105 STORAGE UNIT
105a APPLICATION INFORMATION
106 CONTROL UNIT
106a APPLICATION EXECUTION UNIT
106b COMMUNICATION CONTROL UNIT
106c TRANSMISSION/RECEPTION UNIT

The invention claimed is:

1. An external display device, comprising:

a display unit configured to detachably attach with an information processing device including a camera, with respect to a holding portion that is held by a user, wherein the holding portion is configured to hold the information processing device;

a communication control unit configured to:

control communication with a camera application of the camera that operates in the information processing device;

receive, from the information processing device, a specific identification code transmitted at a specific cycle after the communication with the camera application of the camera in the information processing device is established;

control a port of the display unit based on the reception of the specific identification code transmitted at the specific cycle; and receive, based on the controlled port of the display unit, an external display screen from the information processing device; and a display control unit configured to control the display unit to display the external display screen that is generated by the camera application.

2. The external display device according to claim 1, wherein the camera is an out-camera, and the display unit is held by the holding portion such that a display surface of the display unit faces the user together with the out-camera.

3. The external display device according to claim 2, wherein the external display screen includes at least a camera-through image of the out-camera, and the display control unit is further configured to control the display unit to display by default the external display screen in which the camera-through image is horizontally flipped.

4. The external display device according to claim 3, wherein the external display screen further includes a graphical user interface (GUI) related to an operation of the camera application, and the display control unit is further configured to control the display unit to display the external display screen in which a part of the GUI is excluded from a horizontally flipped target.

5. The external display device according to claim 3, wherein the display control unit is further configured to control the display unit to display the external display screen that is one of horizontally flipped or vertically rotated in a case where a specific event related to the horizontal flip or the vertical rotation occurs.

6. The external display device according to claim 1, wherein the communication control unit is further configured to disable display of the external display screen on the display unit based on closure of the port of the display unit in a case where an identification code indicating end of display is received from the information processing device.

7. The external display device according to claim 1, wherein the external display device is configured to operate based on reception of power supply from one of the information processing device or an external power supply.

8. An information processing device, comprising:

a camera configured to detachably attach with an external display device, with respect to a holding portion that is held by a user, wherein the holding portion is configured to hold the information processing device;

a communication control unit that is configured to:

control communication with the external display device;

transmit specific identification code at a specific cycle to the external display device after the communication with the external display device is established; and transmit an external display screen to the external display device; and an application execution unit that is configured to:

control a camera application of the camera; and control the external display device to display the external display screen generated by the camera application.

9. An external display method, comprising:

controlling communication with a camera application using a camera operating in an information processing device;

receiving, from the information processing device, a specific identification code transmitted at a specific cycle after the communication with the camera application of the camera in the information processing device is established;

controlling a port of a display unit of an external display device based on the reception of the specific identification code transmitted at the specific cycle;

receiving, based on the controlled port of the display unit, an external display screen from the information processing device; and controlling the display unit to display the external display screen that is generated by the camera application.

\* \* \* \* \*